US012737549B2

(12) United States Patent
Xia et al.

(10) Patent No.: US 12,737,549 B2
(45) Date of Patent: Sep. 15, 2026

(54) METHOD AND APPARATUS FOR SENTIMENT ANALYSIS, ELECTRONIC DEVICE AND COMPUTER-READABLE STORAGE MEDIUM

(71) Applicant: MASHANG CONSUMER FINANCE CO., LTD., Chongqing (CN)

(72) Inventors: Zhichao Xia, Chongqing (CN); Xin Wang, Chongqing (CN); Bing Xiao, Chongqing (CN); Quan Lu, Chongqing (CN); Ning Jiang, Chongqing (CN); Haiying Wu, Chongqing (CN)

(73) Assignee: MASHANG CONSUMER FINANCE CO., LTD., Chongqing (CN)

( * ) Notice: Subject to any disclaimer, the term of this patent is extended or adjusted under 35 U.S.C. 154(b) by 204 days.

(21) Appl. No.: 18/740,725

(22) Filed: Jun. 12, 2024

(65) Prior Publication Data

US 2025/0036879 A1 Jan. 30, 2025

(30) Foreign Application Priority Data

Jul. 27, 2023 (CN) ........................ 202310936179.0

(51) Int. Cl.
*G06F 40/30* (2020.01)
*G06F 40/284* (2020.01)

(52) U.S. Cl.
CPC ............ *G06F 40/30* (2020.01); *G06F 40/284* (2020.01)

(58) Field of Classification Search
None
See application file for complete search history.

(56) References Cited

U.S. PATENT DOCUMENTS

| | | | | |
|---|---|---|---|---|
| 12,093,646 | B2 * | 9/2024 | Miao | G06F 40/284 |
| 2020/0073937 | A1 * | 3/2020 | Zhao | G06F 40/30 |
| 2020/0159863 | A1 * | 5/2020 | Wang | G06F 16/3347 |
| 2021/0312135 | A1 * | 10/2021 | Meng | G06F 40/30 |
| 2023/0229847 | A1 * | 7/2023 | Rosedale | G06F 40/284 715/243 |

FOREIGN PATENT DOCUMENTS

| | | | | |
|---|---|---|---|---|
| CN | 105975594 A | * 9/2016 | | G06F 16/35 |
| CN | 110390102 A | * 10/2019 | | G06F 40/30 |
| CN | 110781273 A | * 2/2020 | | G06F 16/3344 |
| CN | 107092596 B | * 8/2020 | | G06N 3/045 |
| CN | 114781390 A | * 7/2022 | | G06N 3/045 |
| CN | 114791950 A | * 7/2022 | | G06N 3/044 |
| CN | 112860894 B | * 6/2023 | | G06N 3/045 |
| CN | 116361462 A | * 6/2023 | | G06F 16/35 |
| CN | 116738999 A | * 9/2023 | | G06F 40/30 |
| KR | 20190008514 A | * 1/2019 | | G06N 3/02 |
| KR | 20190089980 A | * 7/2019 | | G06N 3/045 |
| WO | WO-2023226783 A1 | * 11/2023 | | G06N 3/08 |

* cited by examiner

*Primary Examiner* — Pierre Louis Desir
*Assistant Examiner* — Sean Thomas Smith
(74) *Attorney, Agent, or Firm* — Cooper Legal Group, LLC

(57) ABSTRACT

A method for sentiment analysis includes that: a feature sequence corresponding to text is obtained, the feature sequence includes encoded features; each encoded feature in the feature sequence is processed by using an attention mechanism, to obtain an attention feature of the text; the attention feature is transferred to a spatial transform feature of the text; an entity attribute of the spatial transform feature is recognized, and sentiment mapping is performed based on the spatial transform feature to obtain a sentiment polarity of the entity attribute.

19 Claims, 11 Drawing Sheets

FIG. 8

METHOD AND APPARATUS FOR SENTIMENT ANALYSIS, ELECTRONIC DEVICE AND COMPUTER-READABLE STORAGE MEDIUM

CROSS-REFERENCE TO RELATED APPLICATIONS

This application claims priority to Chinese Patent Application No. 202310936179.0, filed on Jul. 27, 2023, the entire content of which is incorporated herein by reference in its entirety.

BACKGROUND

The artificial intelligence (AI) is a comprehensive technology of computer science, and enables machines to have functions of perception, reasoning and decision-making by studying design principles and implementation methods of various intelligent machines. The artificial intelligence technology is an integrated discipline, and relates to many fields such as natural language processing, machine learning/deep learning. With development of technologies, the artificial intelligence technology will be applied in more fields, and plays an increasingly important role.

Fine-grained sentiment analysis is one of important tasks in the field of natural language processing, and is intended to recognize and understand subtle sentiment tendency and sentiment polarity from text. The technology is widely used in fields such as social media mining, user comment analysis, and market research. However, traditional sentiment analysis methods usually cannot capture fine-grained sentiment information in text, resulting in low accuracy in sentiment analysis.

SUMMARY

The disclosure relates to technologies of artificial intelligence, and in particular to a method and apparatus for sentiment analysis, an electronic device and a computer-readable storage medium.

Embodiments of the disclosure provide a method and apparatus for sentiment analysis, an electronic device and a computer-readable storage medium, which can improve the accuracy and reliability in sentiment analysis.

The technical solution of the embodiments of the disclosure is implemented as follows.

Embodiments of the disclosure provide a method for sentiment analysis, and the method includes following operations.

A feature sequence corresponding to text is obtained, and the feature sequence includes encoded features.

Each of the encoded features in the feature sequence is processed by using an attention mechanism, to obtain an attention feature of the text.

The attention feature is transferred to a spatial transform feature of the text.

An entity attribute of the spatial transform feature is recognized, and sentiment mapping is performed based on the spatial transform feature to obtain a sentiment polarity of the entity attribute.

Embodiments of the disclosure provide an apparatus for sentiment analysis, and the apparatus includes a processor and a memory configured to store a computer program runnable on the processor, and the processor is configured to:

obtain a feature sequence corresponding to text. the feature sequence includes encoded features;

process, by using an attention mechanism, each of the encoded features in the feature sequence, to obtain an attention feature corresponding to the text;

transfer the attention feature to a spatial transform feature of the text; and recognize an entity attribute of the spatial transform feature, and perform sentiment mapping based on the spatial transform feature to obtain a sentiment polarity of the entity attribute.

Embodiments of the disclosure provide a non-transitory computer-readable storage medium having stored thereon computer-executable instructions or computer programs that, when executed by a processor, implement a method for sentiment analysis, and the method includes following operations.

A feature sequence corresponding to text is obtained, and the feature sequence includes encoded features.

Each of the encoded features in the feature sequence is processed by using an attention mechanism, to obtain an attention feature of the text.

The attention feature is transferred to a spatial transform feature of the text.

An entity attribute of the spatial transform feature is recognized, and sentiment mapping is performed based on the spatial transform feature to obtain a sentiment polarity of the entity attribute.

BRIEF DESCRIPTION OF THE DRAWINGS

FIG. 8 illustrates a structural diagram of a sentiment analysis model according to embodiments of the disclosure.

DETAILED DESCRIPTION

Figure 1:
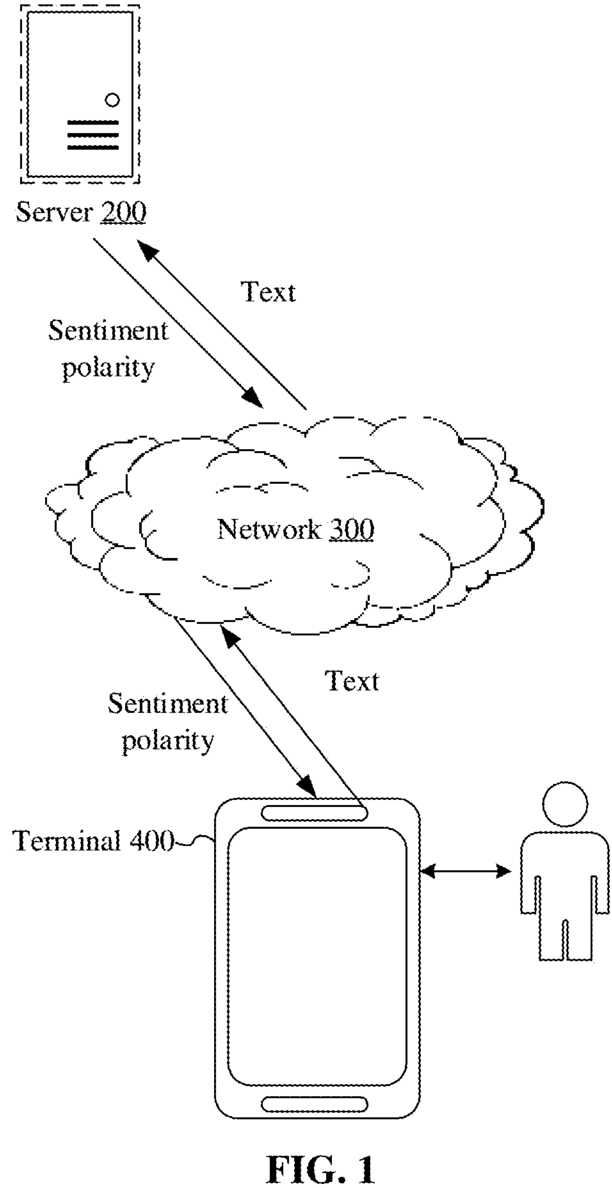
FIG. 1 illustrates a schematic structural diagram of a sentiment analysis system according to embodiments of the disclosure.

To make the purpose, technical solution and advantages of the disclosure clearer, the disclosure is further described in detail in conjunction with the accompanying drawings. The described embodiments should not be construed as limiting to the disclosure, and all other embodiments obtained by those skilled in the art without paying any inventive effort shall fall within the scope of protection of the disclosure.

In the description below, “some embodiments” are involved, and describe a subset of all possible embodiments; but it can be understood that “some embodiments” may be the same subset or different subsets of the all possible embodiments, and may be combined with each other without conflict.

In the description below, the terms “first/second . . . ” involved are merely used to distinguish similar objects, but do not represent a specific order of the objects. It can be understood that “first/second . . . ” may be interchanged with each other by their specific sequence or sequential order when allowed, to enable the embodiments of the disclosure described herein to be implemented in an order other than that illustrated or described herein.

Unless otherwise defined, all technical and scientific terms used herein have the same meaning as those usually understood by those skilled in the art. The terms used herein are merely for the purpose of describing the embodiments of the disclosure, rather than limiting the disclosure.

1) An entity attribute refers an object of sentiment analysis, including an entity and aspects of the entity.

2) A sentiment polarity is positive/negative/neutral sentiment of a user towards an entity attribute (for example, an entity or a specific aspect of the entity), and is used for describing the sentiment tendency for the entity attribute, which generally includes positive, negative and neutral.

During implementation of the embodiments of the disclosure, the applicant found that in a related technology, when performing fine-grained sentiment classification, a feature extraction model is firstly constructed based on a semi-supervised learning method, and a fine-grained sentiment analysis model is constructed by adopting a supervised learning method. The constructed fine-grained sentiment analysis model is used to perform aspect topic classification and fine-grained sentiment classification on comment text. Since a semi-supervised pre-trained model is depended on in the technology, the shortcomings are that a large amount of unlabeled data is needed, and the performance of the pre-trained model is highly depended on. The accuracy of the fine-grained sentiment classification is low when the performance of the pre-trained model is not good. Additionally, when performing fine-grained sentiment classification in some other technologies, topics are extracted through a topic model in a data preprocessing stag, and a complex model structure (for example, including a combination of multiple models) is used to perform sentiment classification. Since the topic model is depended on to extract the topics in the data preprocessing stage, the performance and effect of the topic model may be affected by a data set. If the topics of the data set are distributed in an unbalanced form or are not related to an actual sentiment analysis task, the accuracy of a final result may be affected.

Therefore, a method and apparatus for sentiment analysis, an electronic device and a computer-readable storage medium are provided in the embodiments of the disclosure. When performing sentiment analysis on text, by obtaining a feature sequence corresponding to the text and performing a process using an attention mechanism, the context dependency in the text can be learned sufficiently; by performing space transform on the attention feature to extract and combine spatial transform features of different levels in a multi-layer sentiment space, the text can be represented and abstracted more deeply; and by recognizing an entity attribute of the spatial transform feature and performing sentiment mapping on the recognized entity attribute, to obtain the sentiment polarity of the entity attribute, the accuracy and reliability in sentiment analysis can be improved.

The sentiment analysis provided in the embodiments of the disclosure may be implemented by various types of electronic devices. For example, the sentiment analysis may be implemented by a terminal device or a server alone, or may be implemented by a terminal and a server collaboratively. An exemplary application that an electronic device is implemented as a server in a sentiment analysis system is described below. Referring to FIG. 1, FIG. 1 illustrates a schematic structural diagram of a sentiment analysis system according to embodiments of the disclosure, a terminal 400 is connected to a server 200 through a network 300, and the network 300 may be a wide area network or a local area network, or may be a combination of both.

In some embodiments, the server 200 may be an independent physical server, or may be a server cluster or distributed system composed of multiple physical servers, or may also be a cloud server providing basic cloud computing services such as a cloud service, a cloud database, cloud computing, cloud functions, cloud storage, network services, cloud communication, a middleware service, a domain name service, a security service, a Content Delivery Network (CDN), Big data and AI platform. The terminal 400 may include but is not limited to a cellphone, a computer, a smart voice interaction device, an intelligent home appliance, a vehicle-mounted terminal and so on. The terminal and the server may be connected directly or indirectly in a wired or wireless communication way, which will not be limited in the embodiments of the disclosure.

In some embodiments, the function of the sentiment analysis system is realized based on the server 200. The server 200 obtains a text from the terminal 400. The server 200 extracts features of the text, to obtain a feature sequence corresponding to the text; processes each encoded feature in the feature sequence by using an attention mechanism, to obtain an attention feature corresponding to the text; transfers the attention feature to a spatial transform feature of the text; recognizes an entity attribute of the spatial transform feature, and performs sentiment mapping based on the spatial transform feature to obtain a sentiment polarity for the entity attribute; and sends the sentiment polarity for the entity attribute to the terminal 400.

In some other embodiments, the embodiments of the disclosure may be implemented by means of the cloud technology. The cloud technology refers to a hosted technology that integrates a series of resources such as hardware, software and networks in a wide area network or a local area network to realize computing, storage, processing and sharing of data.

The cloud technology is a collective term of such as network technology, information technology, integration technology, management platform technology and application technology applied based on a business model of cloud computing. In the cloud technology, a resource pool may be formed to be used as needed, which is flexible and convenient. The cloud computing technology will become an important support. The background service of the technology network system needs large amounts of computing and storage resources.

Figure 2:
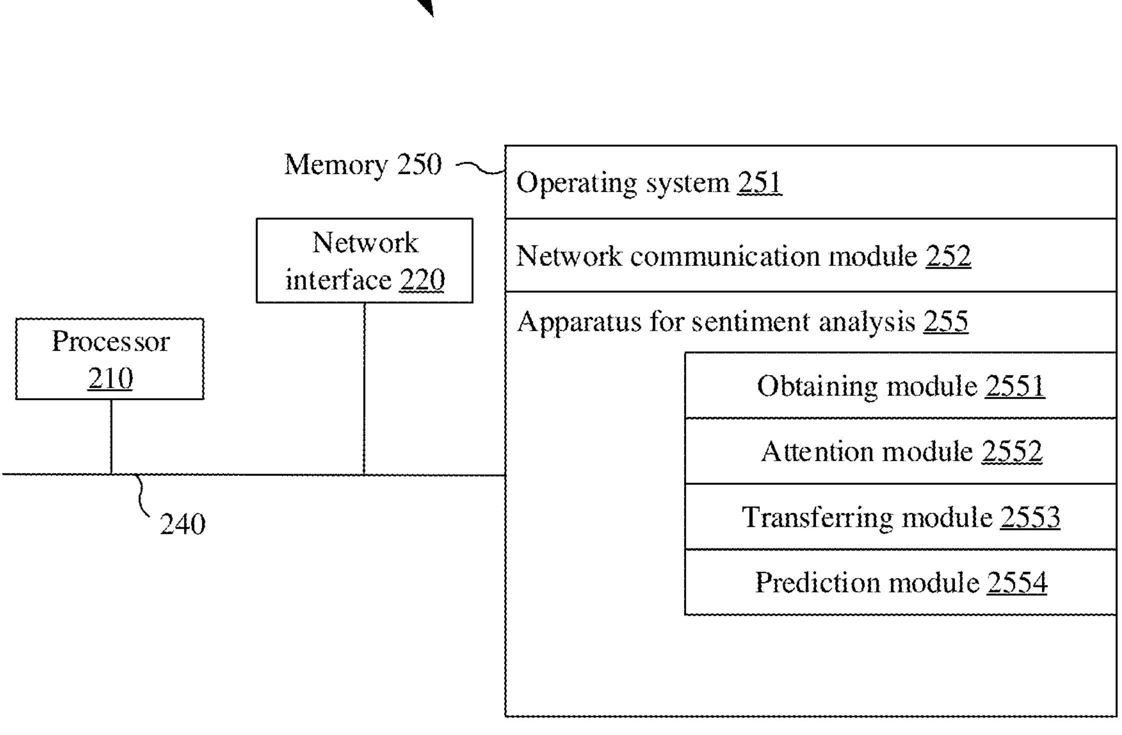
FIG. 2 illustrates a schematic structural diagram of an electronic device according to embodiments of the disclosure.

Next, the structure of an electronic device for implementing a method for sentiment analysis according to the embodiments of the disclosure is described. As described above, the electronic device according to the embodiments of the disclosure may be the server 200 in FIG. 1. Referring to FIG. 2, FIG. 2 illustrates a schematic structural diagram of an electronic device according to embodiments of the disclosure. The server 200 illustrated in FIG. 2 includes at least one processor 210, a memory 250, and at least one network interface 220. Various components in the server 200 are coupled together through a bus system 240. It may be understood that the bus system 240 is used for realizing the connection and communication between the components. Besides a data bus, the bus system 240 further includes a power bus, a control bus and a state signal bus. However, for clarity of description, the buses are all signed as the bus system 240 in FIG. 2.

The processor 210 may be an integrated circuit chip having a signal processing capability, for example a general-purpose processor, a digital signal processor (DSP), or other programmable logic devices, discrete gates or transistor logic devices, discrete hardware components and so on. The general-purpose processor may be such as a micro processor or any conventional processor.

The memory 250 can be removable memory, non-removable, or a combination thereof. Exemplary hardware devices include a solid state memory, a hard disk drive, an optical disk drive or the like. The memory 250 optionally includes one or more storage devices located physically away from the processor 210.

The memory 250 includes a volatile memory or a non-volatile memory, or may include both a volatile memory and a non-volatile memory. The non-volatile memory may be a read only memory (ROM), and the volatile memory may be a random access memory (RAM). The memory 250 described in the embodiments of the disclosure is intended to include any suitable type of memory.

In some embodiments, the memory 250 may store data to support various operations. Examples of the data include programs, modules, data structures, or subsets or supersets thereof. Description is made in an exemplary way below.

An operating system 251 includes a system program for processing various basic system services and performing hardware-related tasks, for example a framework layer, a core library layer and a drive layer, so as to realize various basic services and process hardware-based tasks. A network communication module 252 is used for reaching other devices via one or more (wired or wireless) network interfaces 220. Exemplary network interfaces 220 include Bluetooth, Wireless Fidelity (WiFi), Universal Serial Bus (USB) and so on.

In some embodiments, the apparatus for sentiment analysis according to the embodiments of the disclosure may be realized in software form. FIG. 2 illustrates an apparatus 255 for sentiment analysis stored in the memory 250. The apparatus may be software in form of such as a program and a plugin, including the following software modules: an obtaining module 2551, an attention module 2552, a transferring module 2553, and a prediction module 2554. These modules are logical modules, and may be combined or further divided arbitrarily according to functions implemented. The functions of the modules will be described hereinafter.

In some embodiments, the terminal or server may run a computer program to implement the method for sentiment analysis according to the embodiments of the disclosure. By way of example, the computer program may be a native program (for example, a dedicated sentiment analysis program) or software module in an operating system. The computer program may be a native application (APP), namely a program that should be installed in the operating system to run, or may be an applet that can be embedded into any APP, namely a program that only needs to be downloaded to a browser environment to run. In a word, the above-mentioned computer program may be an application, module or plugin in any form.

The method for sentiment analysis according to the embodiments of the disclosure will be described in combination with exemplary applications and implementations of the server 200 provided in the embodiments of the disclosure.

Figure 3A:
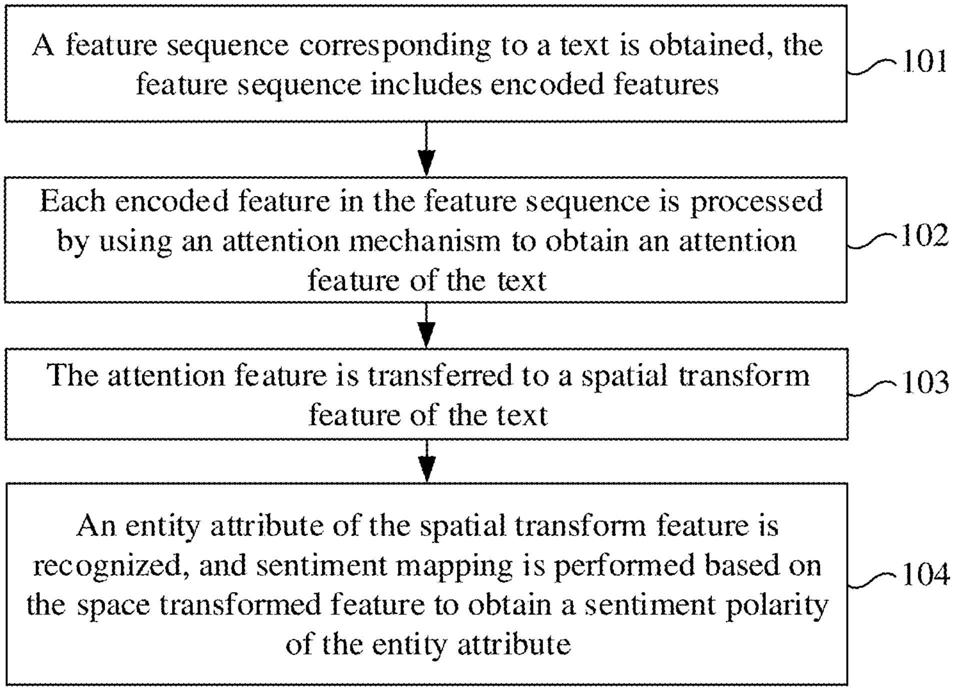
FIG. 3A illustrates a schematic flowchart of a method for sentiment analysis according to embodiments of the disclosure.

Referring to FIG. 3A, FIG. 3A illustrates a schematic flowchart of a method for sentiment analysis according to embodiments of the disclosure. The method includes following operations.

At operation 101, a feature sequence corresponding to text is obtained. The feature sequence includes encoded features.

In some embodiments, a server may obtain the feature sequence corresponding to the text in the following way. The server encodes each of tokens in the text, to obtain an encoded feature of each of the tokens. The server encodes a sentiment classification identifier in the text, to obtain an encoded feature of the sentiment classification identifier. The server generates, based on encoded features of the tokens and the encoded feature of the sentiment classification identifier, the feature sequence of the text. The encoded feature of the sentiment classification identifier is at a start position in the feature sequence, and an order of the encoded features of the tokens in the feature sequence is same as an order of the tokens in the text.

In practical applications, after obtaining the text, the server may perform text preprocessing on the text. The text preprocessing including truncation processing and filling processing. Truncation processing refers to removing stop characters from the text. The stop characters include at least one of: modal particles, and redundant punctuations. These characters have no impact on the semantics of the parsing text and are redundant characters. Removing these characters can refine the parsing text, and can reduce the encoding complexity of the parsing text and the complexity in machine learning. Filling processing refers to filling a sentiment classification identifier [CLS], a text segmentation character [SEP] and a text end character [SEP]. For example, when the text includes a sentence 1 and a sentence 2, the text after preprocessing may be represented as "[CLS], Tok1, . . . , TokN, [SEP1], Tok1, . . . , TokM, [SEP2]". [SEP1] is a text segmentation character for segmenting the sentence 1 and the sentence 2. [SEP2] is a text end character for representing the end of the text. [CLS] is a sentiment classification identifier and has no semantic information, and thus will produce no affect on the feature extraction of the text when performing the feature extraction on the text. However, these characters without obvious semantic information may fuse the semantic information of the characters in the text more "fairly", so as to better represent the semantics of the text.

Each token (or referred to as a character) and the sentiment classification identifier in the text after preprocessing are encoded to obtain corresponding encoded features, for example $T_{[CLS]}$, $T_1$, . . . , $T_N$, $T_{[STP1]}$, $T_1'$, . . . , $T_M'$, $T_{[STP2]}$. $T_{[CLS]}$ is a sentiment classification of the text, and is used for representing the sentiment intention of the text. $T_{[STP1]}$ is a feature corresponding to the text segmentation character in the text, and is used for segmenting different sentences from one another. $T_{[STP2]}$ is a feature corresponding to the text end character, and is used for representing that the text ends here.

In some embodiments, the server may encode each of the tokens in the text in the following way to obtain the encoded feature of each token. The server performs following on each of the tokens: vectorizing the token to obtain a word vector corresponding to the token; performing position encoding on the token according to a position of the token in the text, to obtain a position vector of the token; determining an attribution vector of the token according to a sentence to which the word belongs in the text; and obtaining the encoded feature of the token according to the word vector of the token, the position vector of the token and the attribution vector of the token.

Here, during practical implementation, encoding each of the tokens in the text may be implemented by a neural network-based feature extraction model. For example, the text after preprocessing is input to the feature extraction model to perform feature extraction, to extract a word vector, a position vector and an attribution vector of each token. The word vector may be obtained by performing word embedding processing on the token (namely, a word embedding obtained by performing word embedding is used as the word vector). Word embedding processing refers to dividing words into a limited set of common sub-word units, so that a compromised balance between the effectiveness of the words and flexibility of characters can be realized. The position vector refers to encoding position information of the token into a feature vector, which is a crucial aspect of introducing position relationships of the tokens in the text into the feature extraction model. The attribution vector is used for distinguishing two sentences, and the attribution vectors corresponding to tokens in the same sentence are the same.

After obtaining the word vector, the position vector and the attribution vector of each token, the word vector, the position vector and the attribution vector of the token are simply summed, and a sum result is the encoded feature of the token. Alternatively, the weights of the word vector, the position vector and the attribution vector are obtained respectively, and a weighted sum is performed for the word vector of the token, the position vector of the token and the attribution vector of the token according to these weights, to obtain the encoded feature of the token. Similarly, after obtaining the encoded feature of the sentiment classification identifier, the encoded feature of the sentiment classification identifier is concatenated to the encoded features of the tokens. For example, the encoded feature of the sentiment classification identifier is placed at a start position, and the encoded features of the tokens are arranged according to the order of the tokens in the text; thus the feature sequence of the text can be obtained. Herein, the encoded feature of the sentiment classification identifier is at the start position of the feature sequence, and an order of the encoded features of the tokens in the feature sequence is same as an order of the tokens in the text.

After the feature sequence corresponding to the text is obtained, dimensionality reduction may be performed on the features in the feature sequence. For example, the feature extraction model for extracting the encoded features is a neural network model including multiple neurons. During forward propagation, an activation value of some neuron may stop working with a certain probability (which may be set according to actual needs, for example 0.3, or 0.5). Neuron that are usually hidden in the network are randomly deleted to realize dimensionality reduction. The remaining encoded features after the deletion are used for subsequent processing. In this way, the generalization ability of the feature extraction model can be improved, and because it does not overly depend on some local features in the text, the overfitting problem of the model can be solved.

At operation 102, each encoded feature in the feature sequence is processed by using an attention mechanism, to obtain an attention feature of the text.

Figure 3B:
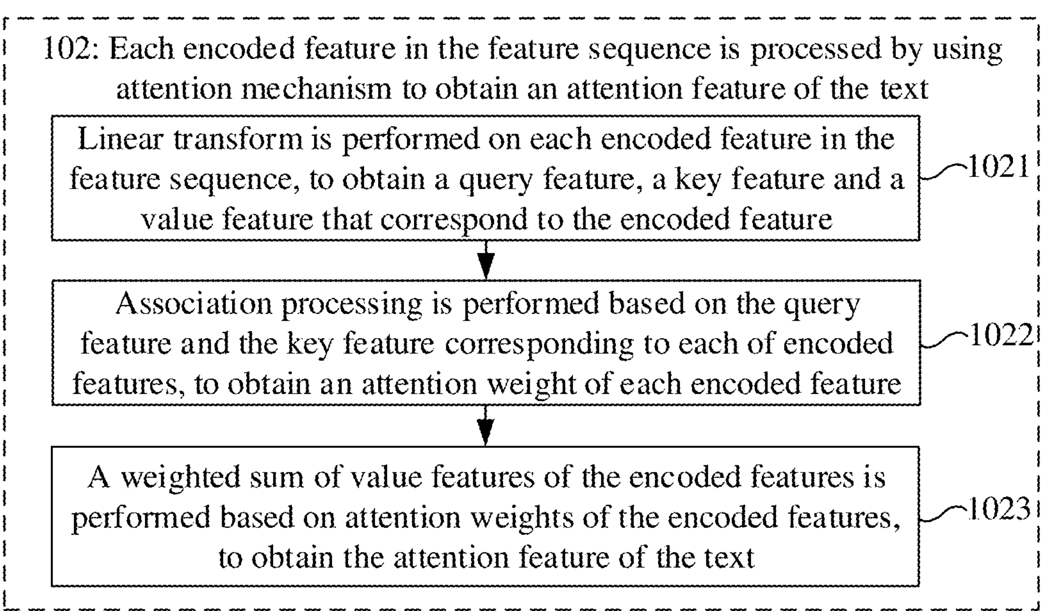
FIG. 3B illustrates a schematic flowchart of a method for sentiment analysis according to embodiments of the disclosure.

In some embodiments, referring to FIG. 3B, FIG. 3B illustrates a schematic flowchart of a method for sentiment analysis according to embodiments of the disclosure. The operation 102 in FIG. 3A may be implemented by operations 1021 to 1023 illustrated in FIG. 3B. At operation 1021, linear transform is performed on each encoded feature in the feature sequence, to obtain a query feature, a key feature and a value feature that correspond to each encoded feature.

With performing linear transform on one encoded feature as an example, assuming that the encoded feature of a token A is X, and linear transform matrixes are $W^Q$, $W^K$ and $W^V$ respectively, then linear transform is performed on the encoded feature X of the token A to obtain a query feature $Q=X*W^Q$, a key feature $K=X*W^K$ and a value feature $V=X*W^V$.

At operation 1022, association processing is performed based on the query feature and the key feature corresponding to each encoded feature, to obtain an attention weight of the each encoded feature.

In some embodiments, the server may perform association processing based on the query feature and the key feature corresponding to each encoded feature, to obtain an attention weight of the each encoded feature in the following way. The server performs following processing on each encoded feature: performing association processing based on the query feature and the key feature, to obtain a first influence factor of the encoded feature; obtaining a maximum prediction length of the feature sequence and a scaling coefficient for controlling a scaling degree of the maximum prediction length, and determining a second influence factor of the encoded feature based on the scaling coefficient, the maximum prediction length and the first influence factor; and performing maximum likelihood processing based on the first influence factor and the second influence factor, to obtain the attention weight of the encoded feature.

In practical application, when performing association processing based on the query features and the key features, dot product processing is firstly performed on the query feature and the transposition of the key feature to obtain a first dot product result. The square root processing is performed on a length of the token to obtain a square root result. Division operation is performed on the first dot product result and the square root result, and an obtained division result is the first influence factor of the encoded feature. It may be seen that the first influence factor is positively correlated to the query feature and the transposition of the key feature, respectively, and the first influence factor is negatively correlated to the length of the encoded feature. Then, the maximum prediction length of the feature sequence and the scaling coefficient for controlling the scaling degree of the maximum prediction length are obtained, and dot product operation is performed on the scaling coefficient and the maximum prediction length to obtain a second dot product result. Dot product processing is performed on the first influence factor and the second dot product result, and an obtained third dot product result is the second influence factor of the encoded feature. Finally, maximum likelihood processing is performed based on the first influence factor and the second influence factor. For example, the first influence factor and the second influence factor are summed to obtain a sum result, and maximum likelihood processing is performed on the sum result, to obtain the attention weight of the token.

Following the above example, when calculating the attention weight of the encoded feature of the token A, dot product processing is performed on the query feature (Q) and the transposition ($K^T$) of the key feature that correspond to the encoded feature of the token A to obtain the first dot product result, denoted as $QK^T$. The square root processing is performed on the length of the token to obtain a square root result ($\sqrt{d_k}$). Division operation is performed on the first dot product result ($QK^T$) and the square root result ($\sqrt{d_k}$) to obtain the division result, namely the first influence factor, denote as $$\left(\frac{QK^T}{\sqrt{d_k}}\right).$$

The maximum prediction length (assumed to be n) of the feature sequence is obtained; and dot product processing is performed on the scaling coefficient (assumed to be $\alpha$, which is a learnable adjustment factor) and a logarithm (log(n+1)) of the maximum prediction length to obtain a second dot product result, denoted as $\alpha \cdot \log(n+1)$. Dot product processing is performed on the first influence factor $$\left(\frac{QK^T}{\sqrt{d_k}}\right)$$

and the second dot product result ($\alpha \cdot \log(n+1)$), to obtain the third dot product result, namely the second influence factor, denoted as $$\alpha \cdot \frac{\log(n+1)}{\sqrt{d_k}} QK^T.$$

The second influence factor $$\alpha \cdot \frac{\log(n+1)}{\sqrt{d_k}} QK^T\Big)$$

and the first influence factor $$\left(\frac{QK^T}{\sqrt{d_k}}\right)$$

are summed to obtain the sum result, and maximum likelihood processing is performed on the sum result to obtain the attention weight corresponding to the encoded feature of the token A, denoted as $$softmax\left(\frac{QK^T}{\sqrt{d_k}} + \alpha \cdot \frac{\log(n+1)}{\sqrt{d_k}} QK^T\right).$$

At operation 1023, a weighted sum of value features of the encoded features is performed based on attention weights of the encoded features, to obtain the attention feature of the text.

Following the above example, the attention weight corresponding to the encoded feature of the token A is multiplied by the value feature of the encoded feature of the token A to obtain a multiplication result. The multiplication result is the attention feature of the encoded feature of the token A, denoted as $$\text{Attention}(Q, K, V) = softmax\left(\frac{QK^T}{\sqrt{d_k}} + \alpha \cdot \frac{\log(n+1)}{\sqrt{d_k}} QK^T\right)V.$$

According to the above way, the attention feature corresponding to each encoded feature in the feature sequence can be obtained. After obtaining the attention feature corresponding to each encoded feature, attention features corresponding to all encoded features may be summed, and a sum result is the attention feature corresponding to the text.

In the way above, the dependency between encoded features in the feature sequence can be learned by a self-adaptive attention mechanism, so as to dig out important features in the text for subsequent sentiment prediction processing, which can improve the accuracy of sentiment analysis.

At 103, the attention feature is transferred to a spatial transform feature of the text.

Here, the spatial transform feature of the text in a multi-layer sentiment space can be obtained by performing space transform on the attention feature of the text. The number of layers in the sentiment space is consistent with the number of classifications of sentiment polarities divided based on entity attributes. For example, the number of layers in the sentiment space is the product of the number of entity attributes multiplied by the number of classifications of sentiment polarities. For example, the classifications of sentiment polarities corresponding to the text include negative, neutral and positive (namely, there are three sentiment classifications). If the number of entity attributes is one and it is assumed that the entity attribute is the entity of cellphone, then three classifications of sentiment polarities are divided according to the entity, which are: cellphone-positive, cellphone-neutral, and cellphone-negative; in this case, the number of layers in the sentiment space is three. If the number of entity attributes is two and it is assumed that the entity attributes are two role aspects, i.e., customer service and user, then six classifications of sentiment polarities are divided according to the role aspects, which are: user-positive, user-neutral, user-negative, customer service-positive, customer service-neutral and customer service-negative; in this case, the number of layers in the sentiment space is six.

Figure 3C:
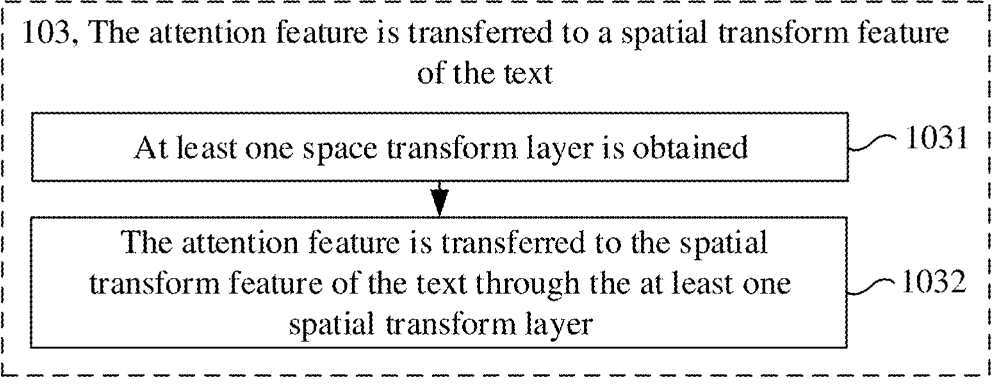
FIG. 3C illustrates a schematic flowchart of a method for sentiment analysis according to embodiments of the disclosure.

In some embodiments, referring to FIG. 3C, FIG. 3C illustrates a schematic flowchart of a method for sentiment analysis according to embodiments of the disclosure. The operation 103 in FIG. 3A may be implemented by operations 1031 to 1032 illustrated in FIG. 3C.

At operation 1031, at least one spatial transform layer is obtained. At operation 1032, the attention feature is transferred to the spatial transform feature of the text through the at least one spatial transform layer.

In some embodiments, in a case that the number of the at least one spatial transform layer is 1, the spatial transform layer contains a linear transform layer and a nonlinear transform layer, and the above operation 1032 may be implemented in the following way: linear transform is performed on the attention feature through the linear transform layer in the spatial transform layer to obtain an intermediate transform feature, and nonlinear mapping is performed on the intermediate transform feature through the nonlinear transform layer in the spatial transform layer to obtain a spatial transform feature of the text in the multi-layer sentiment space.

In some embodiments, in a case that the number of the at least one spatial transform layer is N, each spatial transform layer contains a linear transform layer and a nonlinear transform layer, and the above operation 1032 may be implemented in the following way: linear transform is performed on the attention feature through a linear transform layer in a first spatial transform layer to obtain a first intermediate transform feature, and nonlinear mapping is performed on the first intermediate transform feature through a nonlinear transform layer in the first spatial transform layer to obtain a first spatial transform feature; linear transform is performed on an (i−1)-th spatial transform feature output by an (i−1)-th spatial transform layer through a linear transform layer in an i-th spatial transform layer to obtain an i-th intermediate transform feature, and nonlinear mapping is performed on the i-th intermediate transform feature through a nonlinear transform layer in the i-th spatial transform layer to obtain an i-th spatial transform feature. An N-th spatial transform feature output by an N-th spatial transform layer is determined as the spatial transform feature of the text. N is a positive integer greater than 2, and i is a positive integer greater than 1 and smaller than N−1.

Figure 4:
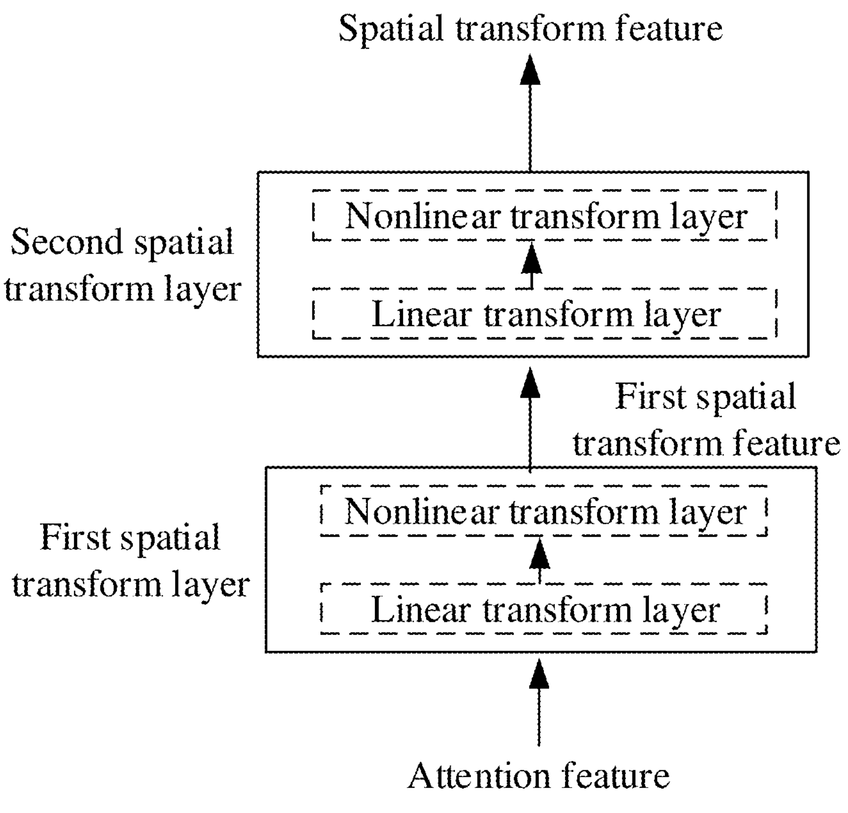
FIG. 4 illustrates a schematic structural diagram of a spatial transform layer according to embodiments of the disclosure.

As an example, referring to FIG. 4, FIG. 4 illustrates a schematic structural diagram of a spatial transform layer according to embodiments of the disclosure. Assuming that the number of the spatial transform layers is two, linear transform is performed on the attention feature through a linear transform layer in a first spatial transform layer to obtain a first intermediate transform feature, and nonlinear mapping is performed on the first intermediate transform feature through a nonlinear transform layer in the first spatial transform layer to obtain a first spatial transform feature. Linear transform is performed on the first spatial transform feature through a linear transform layer in a second spatial transform layer to obtain a second intermediate transform feature, and nonlinear mapping is performed on the second intermediate transform feature through a nonlinear transform layer in the second spatial transform layer to obtain a spatial transform feature of the text in the sentiment space. As such, by performing space transform on the attention feature to extract and combine spatial transform features of different levels in the multi-layer sentiment space, the text can be represented and abstracted more deeply, for subsequent sentiment prediction processing, which can improve the accuracy of sentiment analysis.

At operation 104, an entity attribute of the spatial transform feature is recognized, and sentiment mapping is performed based on the spatial transform feature to obtain a sentiment polarity for the entity attribute.

Figure 3D:
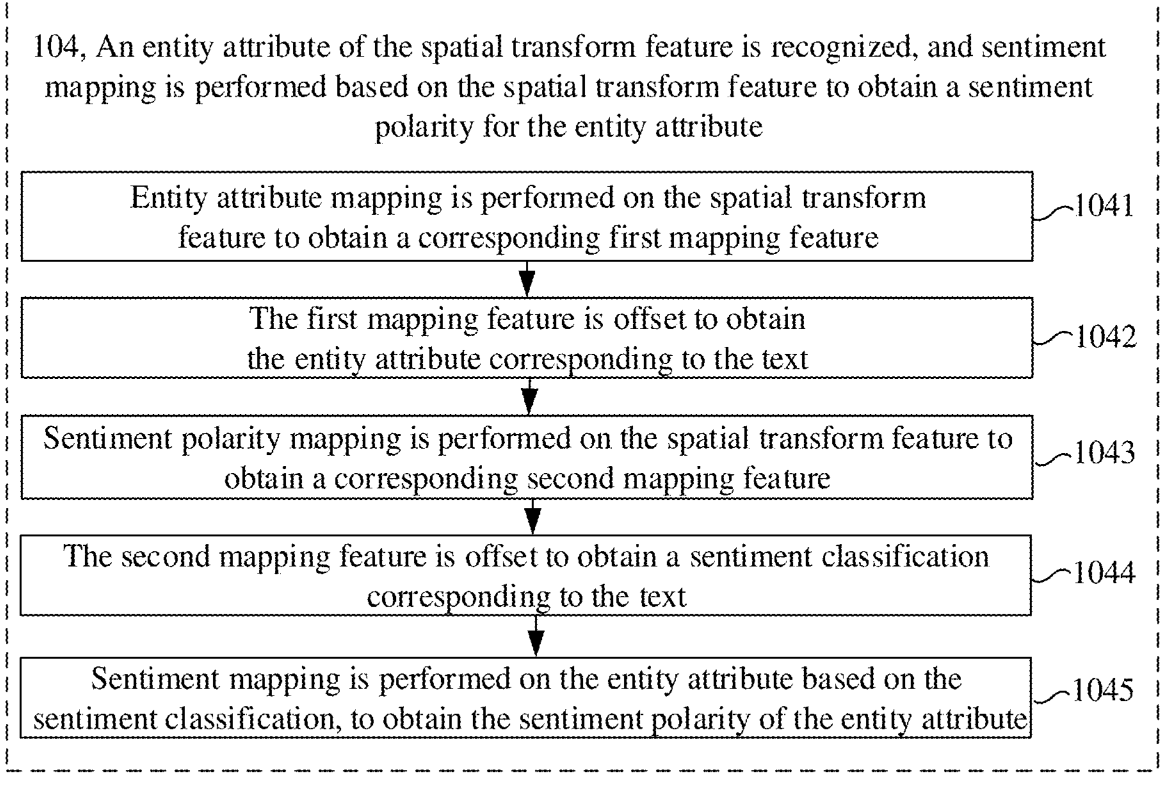
FIG. 3D illustrates a schematic flowchart of a method for sentiment analysis according to embodiments of the disclosure.

In some embodiments, referring to FIG. 3D, FIG. 3D illustrates a schematic flowchart of a method for sentiment analysis according to embodiments of the disclosure. The operation 104 in FIG. 3A may be implemented by operations 1041 to 1045 illustrated in FIG. 3D.

At operation 1041, entity attribute mapping is performed on the spatial transform feature to obtain a corresponding first mapping feature. At operation 1042, the first mapping feature is offset to obtain the entity attribute corresponding to the text. At operation 1043, sentiment polarity mapping is performed on the spatial transform feature to obtain a corresponding second mapping feature. At operation 1044, the second mapping feature is offset to obtain a sentiment classification corresponding to the text. At operation 1045, sentiment mapping is performed on the entity attribute based on the sentiment classification, to obtain the sentiment polarity of the entity attribute.

Here, in practical applications, the spatial transform feature corresponding to the text may be respectively input into an entity recognition model and a sentiment classification model, to perform entity attribute recognition and sentiment classification recognition respectively. The entity recognition model and the sentiment classification model may both be fully connected layers (namely, neural network layers). For example, when performing entity attribute recognition, the spatial transform feature (which is a multi-dimensional feature vector or feature matrix) corresponding to the text is input into the entity recognition model, entity attribute mapping (or linear transform) is performed on the spatial transform feature to obtain a corresponding first mapping feature. For example, all features in the spatial transform feature are multiplied by a corresponding weight matrix (namely, a group of learnable weights) in the entity recognition model to obtain the first mapping feature. Then the first mapping feature is offset, for example the first mapping feature is added with an offset vector, to obtain the entity attribute corresponding to the text.

When performing sentiment classification, the spatial transform feature (namely the spatial transform feature corresponding to $T_{[CLS]}$ above) corresponding to the encoded feature of the sentiment classification identifier in the feature sequence corresponding to the text is input into the sentiment classification model, to perform sentiment classification mapping (or linear transform) on the spatial transform feature to obtain a corresponding second mapping feature. For example, all features in the spatial transform feature are multiplied by a corresponding weight matrix (namely, a group of learnable weights) in the sentiment classification model to obtain the second mapping feature. Then the second mapping feature is offset, for example the second mapping feature is added with an offset vector, to obtain the sentiment classification corresponding to the text.

Then, the entity attribute and the sentiment classification that correspond to the text are parsed, namely sentiment mapping is performed on the entity attribute based on the sentiment classification, to obtain the sentiment polarity of the entity attribute. For example, the text is "the cellphone has good sound quality, but the battery is not durable", the entity attributes obtained through recognition in the above manner include sound quality, and battery, and the obtained sentiment classifications include positive (good) and negative (not durable). Then it can be obtained that the result of sentiment analysis is that the sentiment polarity for the sound quality is positive, and the sentiment polarity for the battery is negative.

Figure 5:
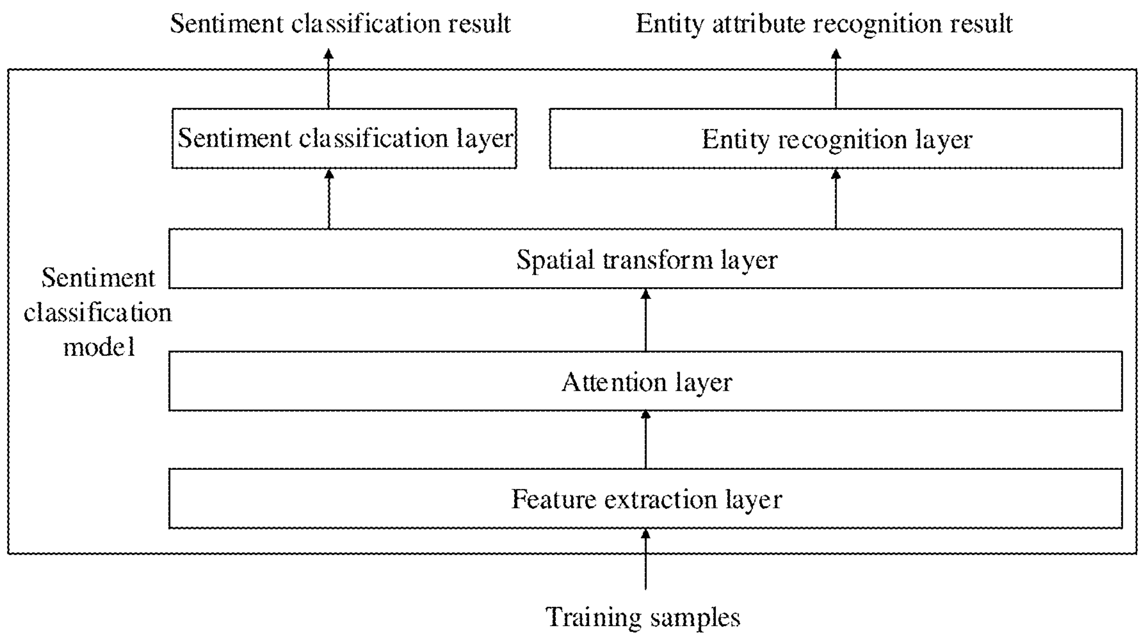
FIG. 5 illustrates a schematic structural diagram of a sentiment analysis model according to embodiments of the disclosure.
Figure 6:
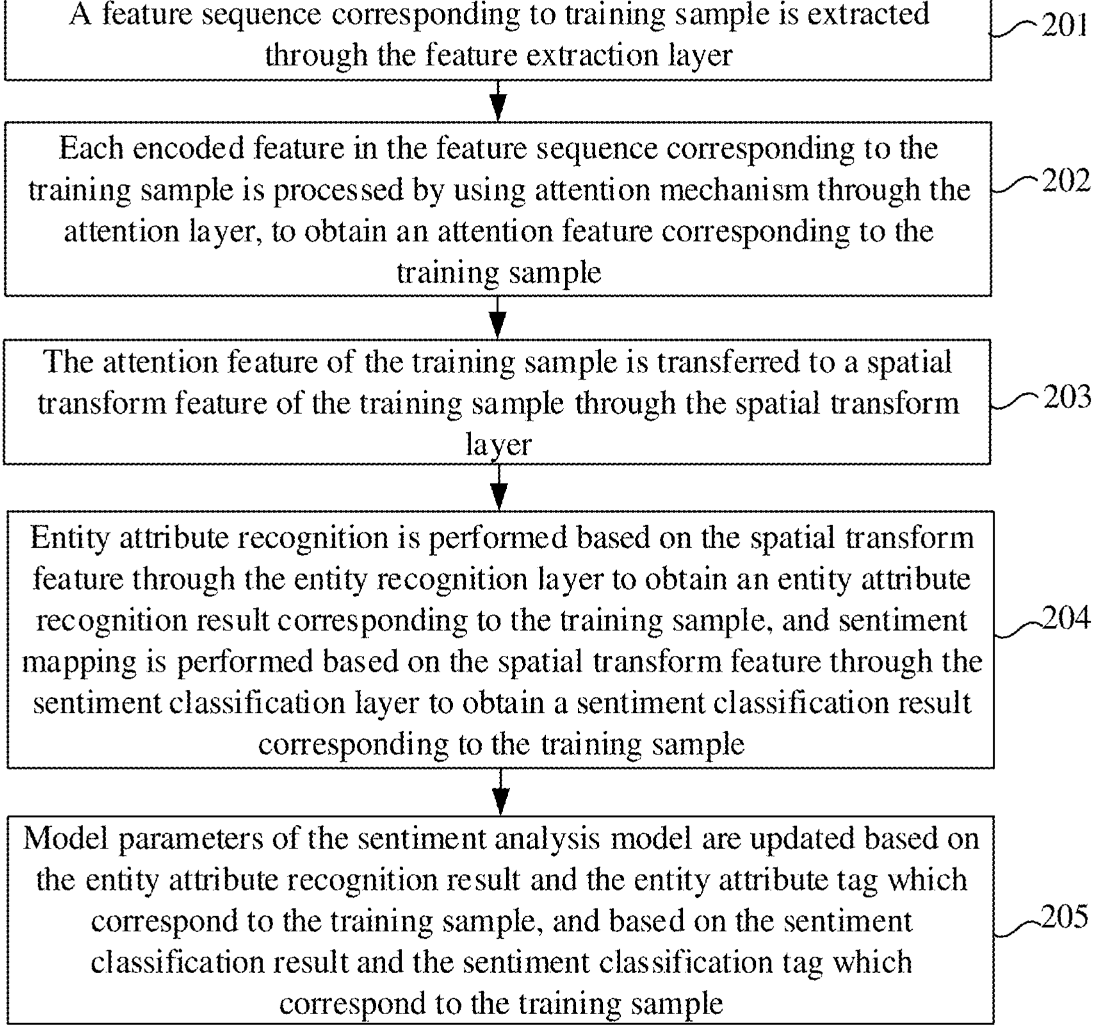
FIG. 6 illustrates a schematic flowchart of a training method for a sentiment analysis model according to embodiments of the disclosure.

In some embodiments, the method for sentiment analysis according to embodiments of the disclosure is implemented by calling a sentiment analysis model. Referring to FIG. 5, FIG. 5 illustrates a schematic structural diagram of a sentiment analysis model according to embodiments of the disclosure. The sentiment analysis model includes a feature extraction layer, an attention layer, a spatial transform layer, an entity recognition layer and a sentiment classification layer. A process of training the sentiment analysis model illustrated in FIG. 5 will be described in conjunction of FIG. 6. FIG. 6 illustrates a schematic flowchart of a training method for a sentiment analysis model according to embodiments of the disclosure. The training method includes following operations.

At operation 201, a feature sequence corresponding to a training sample is extracted through the feature extraction layer. The feature sequence includes encoded features, and the training sample is labeled with an entity attribute tag and a sentiment classification tag. At operation 202, each encoded feature in the feature sequence corresponding to the training sample is processed by using an attention mechanism through the attention layer, to obtain an attention feature corresponding to the training sample. At operation 203, the attention feature of the training sample is transferred to a spatial transform feature of the training sample through the spatial transform layer. At operation 204, entity attribute recognition is performed based on the spatial transform feature through the entity recognition layer to obtain an entity attribute recognition result corresponding to the training sample, and sentiment mapping is performed based on the spatial transform feature through the sentiment classification layer to obtain a sentiment classification result corresponding to the training sample. At operation 205, model parameters of the sentiment analysis model are updated based on the entity attribute recognition result and the entity attribute tag which correspond to the training sample, and based on the sentiment classification result and the sentiment classification tag which correspond to the training sample.

In practical applications, each training sample in a training sample set is input into the sentiment analysis model. The training sample set includes multiple training samples. Since the process performed on each training sample in the training sample set is the same, description is next made with the processing of one training sample as an example. Through the feature extraction layer, feature extraction is firstly performed on the training sample, for example encoding each token in the training sample to obtain an encoded feature of the token in the training sample; a sentiment classification identifier in the training sample is encoded to obtain an encoded feature of the sentiment classification identifier; and a feature sequence corresponding to the training sample is generated based on encoded features of all tokens and the encoded feature of the sentiment classification identifier.

Then, through the attention layer, each encoded feature in the feature sequence corresponding to the training sample is processed by using an attention mechanism, for example performing linear transform on each encoded feature in the feature sequence corresponding to the training sample to obtain a query feature, a key feature and a value feature which correspond to the each encoded feature; association processing is performed based on the query feature and the key feature corresponding to the each encoded feature, to obtain an attention weight of the each encoded feature; and a weighted sum of value features of all encoded features is performed based on attention weights of all encoded features, to obtain the attention feature of the training sample.

Then, through the spatial transform layer (for example at least one spatial transform layer), the attention feature is transferred to the spatial transform feature of the training sample in a multi-layer sentiment space.

Then, entity attribute recognition is performed based on the spatial transform feature through the entity recognition layer, to obtain an entity attribute recognition result corresponding to the training sample, and sentiment mapping is performed based on the spatial transform feature through the sentiment classification layer to obtain a sentiment classification result corresponding to the training sample. The entity attribute recognition result is used for representing a probability that an entity attribute corresponding to the training sample is a labeled entity attribute tag, and the sentiment classification result is used for representing a probability that a sentiment classification corresponding to the training sample is a labeled sentiment classification tag.

Finally, a loss function of the entity recognition layer is constructed based on the entity attribute recognition result and the labeled entity attribute tag corresponding to the training sample, and a loss function of the sentiment classification layer is constructed based on the sentiment classification result and the labeled sentiment classification tag corresponding to the training sample. A loss function of the sentiment analysis model is constructed by combining the loss function of the entity recognition layer and the loss function of the sentiment classification layer, and the model parameters of the sentiment analysis model is updated based on the loss function of the sentiment analysis model.

Figure 7:
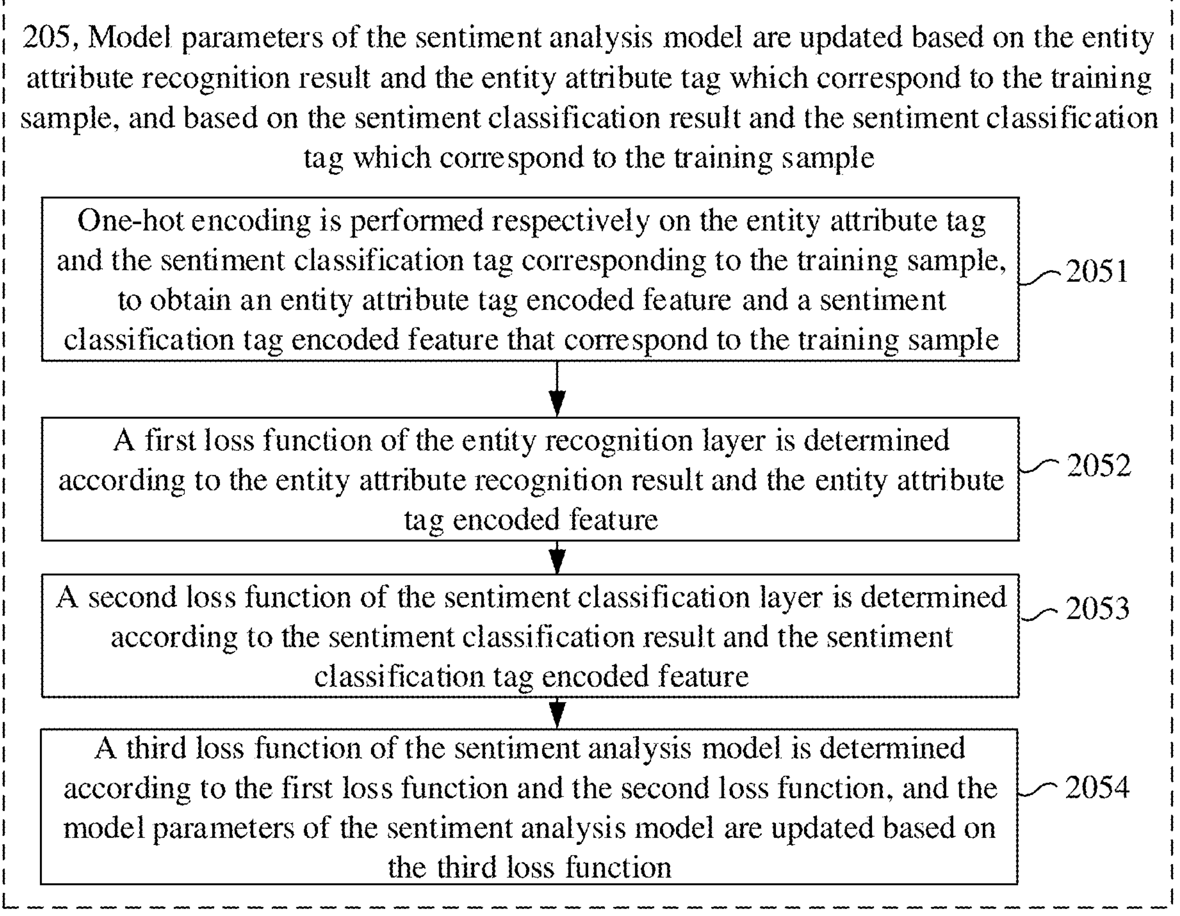
FIG. 7 illustrates a schematic flowchart of a model parameter update method according to embodiments of the disclosure.

In some embodiments, referring to FIG. 7, FIG. 7 illustrates a schematic flowchart of a method for updating model parameters according to embodiments of the disclosure. The operation 205 in FIG. 6 may be implemented by operations 2051 to 2054 illustrated in FIG. 7.

At operation 2051, one-hot encoding is performed respectively on the entity attribute tag and the sentiment classification tag corresponding to the training sample, to obtain an encoded feature of the entity attribute tag and an encoded feature of the sentiment classification tag that correspond to the training sample.

Here, after performing one-hot encoding on the entity attribute tag and the sentiment classification tag corresponding to the training sample, the encoded feature of the entity attribute tag and the encoded feature of the sentiment classification tag that correspond to the training sample are obtained and are both sparse features, which are suitable for subsequently performing multiplication operation with the entity attribute recognition result and the sentiment classification result.

At operation 2052, a first loss function of the entity recognition layer is determined according to the entity attribute recognition result and the encoded feature of the entity attribute tag.

Here, when constructing the first loss function, a logarithm of an entity attribute recognition result is multiplied by an encoded feature of a corresponding entity attribute tag, and the products may be summed to obtain a loss sub-function of the entity recognition layer corresponding to each training sample, and loss sub-functions of the entity recognition layer corresponding to all training samples are averaged to obtain the first loss function of the entity recognition layer.

As an example, the first loss function may be denoted as $$L_1 = \frac{1}{N}\left(\sum_{i=1}^{N} \sum_{k=1}^{C} y_{ik}\log(p_{ik})\right).$$

Herein, N (a positive integer) is the number of training samples in a training set. C represents the number of sentiment classifications (C being a positive integer). $y_{ik}$ is an encoded feature (one-hot encoding) of an entity attribute tag of a training sample i. $p_{ik}$ is a probability (namely an entity attribute recognition result) that a prediction entity attribute of the training sample i ($1 \le i \le N$, and i being a positive integer) is a labeled entity attribute tag k ($1 \le k \le C$, and k being a positive integer).

At operation 2053, a second loss function of the sentiment classification layer is determined according to the sentiment classification result and the encoded feature of the sentiment classification tag.

Here, when constructing the second loss function, a logarithm of a sentiment classification result is multiplied by an encoded feature of a corresponding sentiment classification tag, and the products may be summed to obtain a loss sub-function of the sentiment classification layer corresponding to each training sample, and loss sub-functions of the sentiment classification layer corresponding to all training samples are averaged to obtain the second loss function of the sentiment classification layer.

As an example, the second loss function may be denoted as $$L_2 = \frac{1}{N}\left(\sum_{i=1}^{N} \sum_{c=1}^{C} y_{ic}\log(p_{ic})\right).$$

N is the number of training samples in a training set. C represents the number of sentiment classifications (C being a positive integer). $y_{ic}$ is an encoded feature of the sentiment classification tag (one-hot encoding) of a training sample i. $p_{ic}$ is a probability (namely a sentiment classification result) that a prediction sentiment classification of the training sample i is a labeled sentiment classification tag c ($1 \leq c \leq C$, and c being a positive integer).

At operation 2054, a third loss function of the sentiment analysis model is determined according to the first loss function and the second loss function, and the model parameters of the sentiment analysis model are updated based on the third loss function.

Here, when constructing the third loss function, a first weight coefficient of the first loss function and a second weight coefficient of the second loss function may be obtained, and a weighted sum of the second loss function and the first loss function is obtained based on the first weight coefficient and the second weight coefficient, to obtain the third loss function of the sentiment analysis model. The model parameters of the sentiment analysis model are updated based on the third loss function.

As an example, the third loss function may be represented as:

$$\text{Loss} = \lambda_1 L_1 + \lambda_2 L_2 = \lambda_1\left(-\frac{1}{N}\left(\sum_{i=1}^{N} \sum_{k=1}^{C} y_{ik}\log(p_{ik})\right)\right) + \lambda_2\left(-\frac{1}{N}\left(\sum_{i=1}^{N} \sum_{c=1}^{C} y_{ic}\log(p_{ic})\right)\right)$$

$\lambda_1$ is the first weight coefficient of the first loss function, and $\lambda_2$ is the second weight coefficient of the second loss function. These weight coefficients may be adaptively adjusted according to the training process of the sentiment analysis model, so as to dynamically adjust an entity attribute recognition task and a sentiment classification task. The sentiment analysis model can autonomously determine the importance among different learning tasks according to a current training state and allocate training resources in an optimal manner. By adaptively adjusting the weight coefficients, the loss contribution of the sentiment classification task and the entity recognition task can be better balanced, preventing the case that one task generates too much interference on the other task.

After the third loss function is constructed, whether a value of the third loss function exceeds a preset threshold is determined based on the value of the third loss function. When the value of the third loss function exceeds the preset threshold, an error signal of the sentiment analysis model is determined based on the third loss function. The error signal is back propagated in the sentiment analysis model, and the model parameters of various layers are updated during the propagation.

Here, back propagation is described. A feature sequence of a training sample is input to an input layer of a neural network model, passes through a hidden layer, and finally reaches at an output layer, and a result is output. This is a forward propagation process of the neural network model. Since there is an error between the output result of the neural network model and an actual result, the error between the output result and an actual value is calculated, and the error is back propagated from the output layer to the hidden layer, until reaching the input layer. During the back propagation, values of the model parameters are adjusted according to the error. The above processes are iterated continuously until convergence is achieved. The sentiment analysis model belong to a neural network model.

According to the way above, by obtaining the feature sequence corresponding to the text, overfitting caused by excessive irrelevant features is reduced. By performing attention processing on the feature sequence, the context dependencies in the text can be learned sufficiently. By performing space transform on the attention feature to extract and combine spatial transform features of different levels in a multi-layer sentiment space, the text can be represented and abstracted more deeply. By performing entity attribute recognition based on the spatial transform feature and performing sentiment mapping on the recognized entity attribute, to obtain the sentiment polarity for the entity attribute, the accuracy and reliability in sentiment analysis can be improved.

Hereinafter, an exemplary application of the embodiments of the disclosure in a practical application scenario is described. In an actual post-loan collection service scenario, by digging out a sentiment change of a customer service and a user in a dialogue scene, violation of the customer service and sentiment of the user can be detected, thereby reducing a complaint rate of the customer. In this scenario, the text is transcribed call recordings processed automatic speech recognition (ASR), where relevant information is dispersed and the call recordings are usually long. Hence, the introduction of a self-adaptive attention mechanism can effectively improve the accuracy of sentiment analysis in the service scenario.

Figure 8:
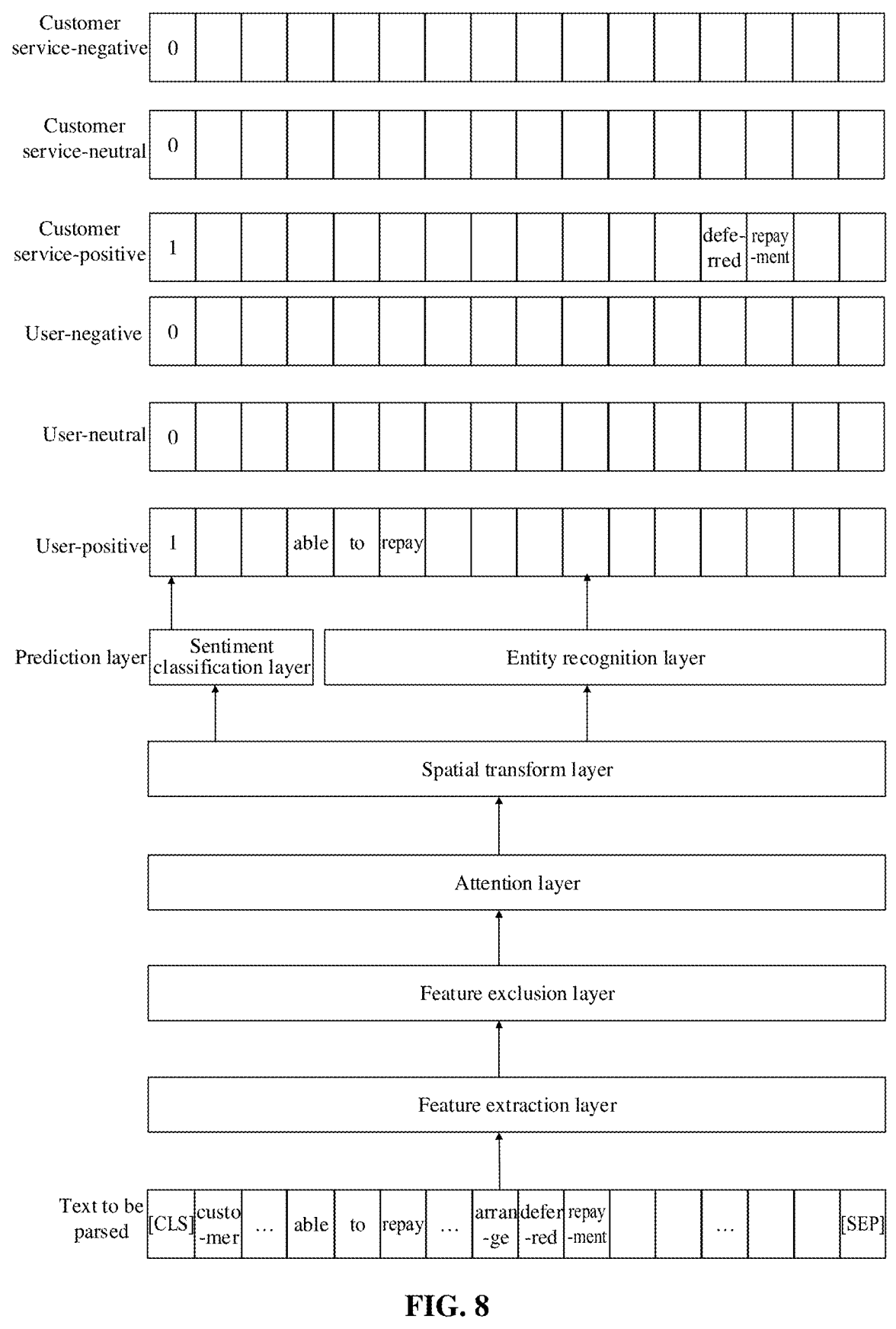

In practical applications, the method for sentiment analysis according to the embodiments of the disclosure may be implemented based on a sentiment analysis model. Referring to FIG. 8, FIG. 8 illustrates a structural diagram of a sentiment analysis model according to embodiments of the disclosure. The sentiment analysis model includes a feature extraction layer, a feature exclusion layer, an attention layer, a spatial transform layer, a prediction layer (including a sentiment classification layer and an entity recognition layer), which are described below one by one.

1. Feature Extraction Layer

As illustrated in FIG. 8, a text (such as a dialogue between a customer service and a user in an actual post-load collection service scenario illustrated in a left part of table 1) is input to the sentiment analysis model. Through the feature extraction layer, each token in the text is encoded to obtain an encoded feature of the token, and a sentiment classification identifier in the text is encoded to obtain an encoded feature of the sentiment classification identifier; a feature sequence corresponding to the text is generated based on encoded features of all tokens and the encoded feature of the sentiment classification identifier. The encoded feature of the sentiment classification identifier is at a start position in the feature sequence, and an order of the encoded features of the tokens in the feature sequence is same as an order of the tokens in the text.

When encoding each of the tokens, following operations are performed on each of the tokens: vectorizing the token to obtain a word vector corresponding to the token; performing position encoding on the token according to a position of the token in the text, to obtain a position vector of the token; determining an attribution vector of the token according to a sentence to which the token belongs in the text; and obtaining the encoded feature of the token by summing the word vector of the token, the position vector of the token and the attribution vector of the token.

2. Feature Exclusion Layer

Through the feature exclusion layer, dimensionality reduction is performed on the encoded features in the feature sequence of the text, for example deleting the encoded features of some tokens randomly, to reduce overfitting. The remaining encoded features after the exclusion are used for subsequent processing.

3. Attention Layer

Through the attention layer, each encoded feature in the feature sequence of the text is processed by using an attention mechanism, to obtain an attention feature corresponding to the text. For example, an attention feature of each encoded feature is calculated by the following enhanced attention formula. A weighted sum of attention features of all encoded features is performed based on attention weights of all encoded features, to obtain the attention feature corresponding to the text:

$$\text{Attention}(Q, K, V) = softmax\left(\frac{QK^T}{\sqrt{d_k}} + \alpha \cdot \frac{\log(n+1)}{\sqrt{d_k}} QK^T\right)V.$$

Q is a query feature of the encoded feature, K is a key feature of the encoded feature, and V is a value feature of the encoded feature. $d_k$ is a length of the encoded feature. n is a maximum prediction length of the feature sequence corresponding to the text. $\alpha$ is a learnable adjustment factor, and is used for controlling a scaling degree of the maximum prediction length.

In the above enhanced attention formula, $\alpha$ and an item related to an input sequence length (the maximum prediction length) are introduced, which can better adapted to different datasets and tasks, thereby improving the model in the capability of concerning the text and the capability of comprehending the semantics of the text.

4. Spatial Transform Layer

Through the spatial transform layer, the attention feature is transferred to a spatial transform feature of the text in a multi-layer sentiment space. The number of layers in the sentiment space is consistent with the number of classifications of sentiment polarities divided based on entity attributes. As illustrated in FIG. 8, the classifications of sentiment polarities corresponding to the text include negative, neutral and positive, and the entity attributes include two role aspects, i.e., customer service and user; then six classifications of sentiment polarities are divided according to the role aspects, which are: user-positive, user-neutral, user-negative, customer service-positive, customer service-neutral and customer service-negative. In this case, the number of layers in the sentiment space is six.

There may be multiple spatial transform layers. Each spatial transform layer includes a linear transform layer and a nonlinear transform layer. The linear transform layer is used for performing linear transform. The linear transform layer receives an input sentence vector (in a case of a linear transform layer in a first spatial transform layer, the sentence vector is the obtained attention feature of the text described above; and in a case of a linear transform layer in an i-th spatial transform layer, the sentence vector is an (i−1)-th spatial transform feature output by an (i−1)-th spatial transform layer) and performs linear transform by matrix multiplication and an offset item addition. By the linear transform, the sentence vector is mapped to an intermediate feature space, so that subsequent nonlinear transform can better capture and represent the feature.

The nonlinear transform layer is used for performing nonlinear mapping, for example the nonlinear transform layer is deployed with a nonlinear activation function, such as ReLU, sigmoid or tanh. A nonlinear property is introduced by the nonlinear transform layer, thereby helping the network to learn more complex and abstract features.

When there are multiple spatial transform layers, a multi-layer feature extraction structure is formed by stacking multiple linear transform layers and multiple nonlinear transform layers. Each layer takes an output of previous layer as an input, and performs linear transform and nonlinear transform on the input. Such a multi-layer structure can gradually extract and combine features of different levels, enabling the network to represent and abstract the input more deeply.

5. Prediction Layer

The prediction layer includes a sentiment classification layer and an entity recognition layer. The entity recognition layer may be a fully connected layer (namely, a neural network layer). For example, when performing entity attribute recognition, the spatial transform feature (which is a multi-dimensional feature vector or feature matrix) corresponding to the text is input into the entity recognition layer, to perform entity attribute mapping (or linear transform) on the spatial transform feature to obtain a corresponding first mapping feature. For example, all features in the spatial transform feature are multiplied by a corresponding weight matrix (namely, a group of learnable weights) in the entity recognition model to obtain the first mapping feature. Then the first mapping feature is offset, for example the first mapping feature is added with an offset vector, to obtain the entity attribute corresponding to the text.

Similarly, the sentiment classification layer may be considered as a fully connected neural network. An input of the sentiment classification layer is a spatial transform feature corresponding to the encoded feature of the sentiment classification identifier in the text. When performing sentiment classification, the spatial transform feature (namely the spatial transform feature corresponding to $T_{[CLS]}$ above) corresponding to the encoded feature of the sentiment classification identifier in the feature sequence corresponding to the text is input into the sentiment classification model, to perform sentiment classification mapping (or linear transform) on the spatial transform feature to obtain a corresponding second mapping feature. For example, all features in the spatial transform feature are multiplied by a corresponding weight matrix (namely, a group of learnable weights) in the sentiment classification model to obtain the second mapping feature. Then the second mapping feature is offset, for example the second mapping feature is added with an offset vector, to obtain the sentiment classification corresponding to the text. Then, the entity attribute and the sentiment classification corresponding to the text are parsed, namely sentiment mapping is performed on the entity attribute based on the sentiment classification, to obtain the sentiment polarity for the entity attribute.

As illustrated in FIG. 8, after the text (the dialogue as shown in table 1) is input into the sentiment analysis model, the corresponding recognized entity attributes include: customer service-deferred repayment, user-able to repay, and the output sentiment classifications include: customer service-positive (corresponding to the entity attribute "customer service-deferred repayment") and user-positive (corresponding to the entity attribute "user-able to repay").

For example, referring to table 1, left part of table 1 shows a dialogue (namely, the text illustrated in FIG. 8) between a customer service and a user in an actual post-load collection service scenario, and a right part of table 1 shows a sentiment analysis result obtained through the method for sentiment analysis according to the embodiments of the disclosure. For example, the recognized entity attributes include customer service-Aspect: deferred repayment, and user-Aspect: able to repay; and sentiment polarities include a sentiment polarity for the customer service and a sentiment polarity for the user. It can be seen from both FIG. 8 and table 1 that: the sentiment polarity for the entity attribute "customer service-deferred repayment" is "positive", and the sentiment polarity for the entity attribute "user-able to repay" is also positive.

TABLE 1

| Dialogue | Sentiment analysis result |
| --- | --- |
| User: Hello, I am a customer of your company, and I would like to consult about my loan repayment. Customer service: Hello, please tell me your loan account number, and I can help you check. User: My loan account number is 123456789. Customer service: Ok, let me check . . . , according to our record, there is an outstanding repayment on your loan. When do you think you will be able to pay it off? User: I'm very sorry. I have some difficulties in this month, and I need to defer the repayment for a week. Customer service: Ok, I understand your situation. We can arrange a deferment for your repayment. Could you please provide a specific date for the deferred repayment? User: Thank you for your understanding. I expect to be able to make the repayment next Friday. Customer service: Thank you for providing your information. I will make a note and arrange for the deferred repayment for you. Please ensure that you complete the repayment by the agreed-upon date to avoid any additional charges. | Customer service-Aspect: Deferred repayment Customer service-sentiment classification: Positive User-Aspect: Able to repay User-sentiment classification: Positive |

TABLE 2

| Dialogue | Sentiment analysis result |
| --- | --- |
| Customer service: Hello! Customer service: Hello, is it time to deal with the loan issued by XXX-Pay? User: Who is that? Customer service: it is your time to deal with the loan issued by XXX-Pay. Customer service: Hello, madam. Customer service: If you still continue to refuse to cooperate, or refuse to repayment, we may have to contact you. User: Hum. Customer service: the village secretary in the Panlong District Customer service: will verify the economic income of your entire household. Customer service: If you still continue to refuse to cooperate, Customer service: please explain this clearly to your family on your own. Okay? Customer service: Goodbye! | Customer service-Aspect: Village secretary Customer service-sentiment polarity: Negative User-Aspect: Refuse to repay User-sentiment polarity: Negative |

Next, training for the sentiment analysis model is described. Considering that the method for sentiment analysis according to the embodiments of the disclosure involve two tasks (namely entity attribute recognition and sentiment classification), joint training for multiple tasks may be performed when training the sentiment analysis model. For example, a feature sequence corresponding to each training sample in a training sample set is extracted through a feature extraction layer, and the feature sequence includes encoded features, and each training sample is labeled with an entity attribute tag and a sentiment classification tag. Some training samples is excluded through a feature exclusion layer from the training sample set, or some encoded features in the feature sequence corresponding to each training sample is excluded through a feature exclusion layer, to solve the overfitting problem of the model.

Each encoded feature in the feature sequence corresponding to each training sample is processed by using an attention mechanism through an attention layer, to obtain an attention feature corresponding to each training sample. The attention feature corresponding to each training sample is transferred to a spatial transform feature of each training sample through a spatial transform layer. Entity attribute recognition is performed based on the spatial transform Referring to table 2, a left part of table 2 shows another dialogue (namely, the above-mentioned text) between a customer service and a user in an actual post-load collection service scenario, and a right part of table 2 shows a sentiment analysis result obtained through the method for sentiment analysis according to the embodiments of the disclosure. For example, the recognized entity attributes include customer service-Aspect: village secretary, and user-Aspect: refusal to repay. The sentiment polarities include a sentiment polarity of the customer service and a sentiment polarity of the user. For example, the sentiment polarity of the customer service is negative, and the sentiment polarity of the user is also negative.

feature through an entity recognition layer to obtain an entity attribute recognition result corresponding to each training sample, and sentiment mapping is performed based on the spatial transform feature to obtain a sentiment classification result corresponding to each training sample. Model parameters of the sentiment analysis model are updated based on the entity attribute recognition result and the entity attribute tag that correspond to each training sample, and based on the sentiment classification result and the sentiment classification tag that correspond to each training sample.

When updating the model parameters of the sentiment analysis model, a loss function of the sentiment analysis model may be constructed in the following way: firstly a first loss function of the entity recognition layer is constructed based on the entity attribute recognition result and the entity attribute tag that correspond to each training sample. As an example, the first loss function may be denoted as $$L_1 = \frac{1}{N}\left(\sum_{i=1}^{N} \sum_{k=1}^{C} y_{ik}\log(p_{ik})\right).$$

Herein, N (a positive integer) is the number of training samples in a training set. C represents the number of sentiment classifications (C being a positive integer). $y_{ik}$ is an encoded feature of the entity attribute tag (one-hot encoding) of a training sample i. $p_{ik}$ is a probability (namely an entity attribute recognition result) that a prediction entity attribute of the training sample i ($1 \le i \le N$, and i being a positive integer) is a labeled entity attribute tag k ($1 \le k \le C$, and k being a positive integer).

Then a second loss function of the sentiment classification layer is constructed based on the sentiment classification result and the sentiment classification tag that correspond to each training sample. As an example, the second loss function may be denoted as $$L_2 = \frac{1}{N}\left(\sum_{i=1}^{N} \sum_{c=1}^{C} y_{ic}\log(p_{ic})\right).$$

N is the number of training samples in a training set. C represents the number of sentiment classifications (C being a positive integer). $y_{ic}$ is an encoded feature of the sentiment classification tag (one-hot encoding) of a training sample i. $p_{ic}$ is a probability (namely a sentiment classification result) that a prediction sentiment classification of the training sample i is a labeled sentiment classification tag c ($1 \le c \le C$, and c being a positive integer).

Finally, a first weight coefficient of the first loss function and a second weight coefficient of the second loss function are obtained, and a weighted sum of the second loss function and the first loss function is obtained based on the first weight coefficient and the second weight coefficient, to obtain the third loss function of the sentiment analysis model. The model parameters of the sentiment analysis model are updated based on the third loss function. As an example, the third loss function may be represented as:

$$\text{Loss} = \lambda_1 L_1 + \lambda_2 L_2 = \lambda_1\left(-\frac{1}{N}\left(\sum_{i=1}^{N} \sum_{k=1}^{C} y_{ik}\log(p_{ik})\right)\right) + \lambda_2\left(-\frac{1}{N}\left(\sum_{i=1}^{N} \sum_{c=1}^{C} y_{ic}\log(p_{ic})\right)\right).$$

$\lambda_1$ is the first weight coefficient of the first loss function, and $\lambda_2$ is the second weight coefficient of the second loss function. These weight coefficients may be adaptively adjusted according to the training process of the sentiment analysis model, so as to dynamically adjust an entity attribute recognition task and a sentiment classification task. The sentiment analysis model autonomously determine the importance among different learning tasks according to a current training state and allocate training resources in an optimal manner. By adaptively adjusting the weight coefficients, the loss contribution of the sentiment classification task and the entity recognition task can be better balanced, preventing the case that one task generates too much interference on the other task.

In the way above, for a text that has long text and dispersed important information, and has high dependency on context, the method for sentiment analysis according to the embodiments of the disclosure can parse out the sentiment change of the customer service and the user more accurately. In addition, joint training for tasks can effectively reduce the application process complexity, reduce link request latency and save computing resources.

An exemplary structure of the apparatus 255 for sentiment analysis according to the embodiments of the disclosure being implemented as software modules is described below continuously. In some embodiments, as illustrated in FIG. 2, software modules in the apparatus 255 for sentiment analysis stored in the memory 250 may include an obtaining module 2551, an attention module 2552, a transferring module 2553, and a prediction module 2554.

The obtaining module 2551 is configured to obtain a feature sequence corresponding to a text, and the feature sequence includes encoded features. The attention module 2552 is configured to process each encoded feature in the feature sequence by using an attention mechanism, to obtain an attention feature corresponding to the text. The transferring module 2553 is configured to transfer the attention feature to a spatial transform feature of the text. The prediction module 2554 is configured to: recognize an entity attribute of the spatial transform feature, and perform sentiment mapping based on the spatial transform feature to obtain a sentiment polarity of the entity attribute.

In some embodiments, the obtaining module 2551 is further configured to: encode each token in the text, to obtain an encoded feature of the each token; encode a sentiment classification identifier in the text, to obtain an encoded feature of the sentiment classification identifier; generate, based on encoded features of all tokens and the encoded feature of the sentiment classification identifier, the feature sequence corresponding to the text. Herein, the encoded feature of the sentiment classification identifier is at a start position in the feature sequence, and an order of the encoded features of the tokens in the feature sequence is same as an order of the tokens in the text.

In some embodiments, the obtaining module 2551 is further configured to perform following on each of the tokens: vectorize the token to obtain a word vector corresponding to the token; perform position encoding on the token according to a position of the token in the text, to obtain a position vector of the token; determine an attribution vector of the token according to a sentence to which the token belongs in the text; and obtain the encoded feature of the token according to the word vector of the token, the position vector of the token and the attribution vector of the token.

In some embodiments, the attention module 2552 is further configured to: perform linear transform on each encoded feature in the feature sequence, to obtain a query feature, a key feature and a value feature that correspond to the each encoded feature; perform association processing based on the query feature and the key feature corresponding to each of the encoded features, to obtain an attention weight of the encoded feature; and perform a weighted sum of the value features of all encoded features based on attention weights of all encoded features, to obtain the attention feature of the text.

In some embodiments, the attention module 2552 is further configured to perform following on each encoded feature, including: perform association processing based on the query feature and the key feature corresponding to the encoded feature to obtain a first influence factor of the encoded feature, the first influence factor is positively correlated to the query feature and a transposition of the key feature, and is negatively correlated to a length of the encoded feature; obtain a maximum prediction length of the feature sequence and a scaling coefficient for controlling a scaling degree of the maximum prediction length, and determine a second influence factor of the encoded feature based on the scaling coefficient, the maximum prediction length and the first influence factor; and perform maximum likelihood processing based on the first influence factor and the second influence factor, to obtain the attention weight of the encoded feature.

In some embodiments, the transferring module 2553 is further configured to: obtain at least one spatial transform layer; and transfer, by the at least one spatial transform layer, the attention feature to the spatial transform feature of the text.

In some embodiments, each spatial transform layer includes a linear transform layer and a nonlinear transform layer. The transferring module 2553 is further configured to: in a case that the number of the spatial transform layers is N, perform linear transform on the attention feature through a linear transform layer in a first spatial transform layer to obtain a first intermediate transform feature, and perform nonlinear mapping on the first intermediate transform feature through a nonlinear transform layer in the first spatial transform layer to obtain a first spatial transform feature; perform, through a linear transform layer in an i-th spatial transform layer, linear transform on an (i−1)-th spatial transform feature output by an (i−1)-th spatial transform layer to obtain an i-th intermediate transform feature, and perform, through a nonlinear transform layer in the i-th spatial transform layer, nonlinear mapping on the i-th intermediate transform feature to obtain an i-th spatial transform feature; and determine an N-th spatial transform feature output by an N-th spatial transform layer as the spatial transform feature of the text in a multi-layer sentiment space. N is a positive integer greater than 2, and i is a positive integer greater than 1 and smaller than N−1.

In some embodiments, the prediction module 2554 is further configured to: perform entity attribute mapping on the spatial transform feature to obtain a corresponding first mapping feature; and offset the first mapping feature to obtain the entity attribute corresponding to the text.

In some embodiments, the prediction module 2554 is further configured to: perform sentiment polarity mapping on the spatial transform feature to obtain a corresponding second mapping feature; perform offset processing on the second mapping feature to obtain a sentiment classification corresponding to the text; and perform sentiment mapping on the entity attribute based on the sentiment classification, to obtain the sentiment polarity of the entity attribute.

In some embodiments, the method for sentiment analysis is implemented by calling a sentiment analysis model, the sentiment analysis model includes: a feature extraction layer, an attention layer, a spatial transform layer, an entity recognition layer and a sentiment classification layer. The apparatus further includes a training module, which is configured to: extract a feature sequence corresponding to a training sample through the feature extraction layer, the training sample is labeled with an entity attribute tag and a sentiment classification tag; perform attention processing on the feature sequence corresponding to the training sample through the attention layer, to obtain an attention feature corresponding to the training sample; transfer the attention feature of the training sample, through the spatial transform layer, to a spatial transform feature of the training sample in a multi-layer sentiment space; recognize entity attribute of the spatial transform feature through the entity recognition layer to obtain an entity attribute recognition result corresponding to the training sample, and perform sentiment mapping based on the spatial transform feature to obtain a sentiment classification result corresponding to the training sample; and update model parameters of the sentiment analysis model based on the entity attribute recognition result and the entity attribute tag which correspond to the training sample, and based on the sentiment classification result and the sentiment classification tag which correspond to the training sample.

In some embodiments, the training module is further configured to: perform one-hot encoding on the entity attribute tag and the sentiment classification tag corresponding to the training sample respectively, to obtain an encoded feature of the entity attribute tag and an encoded feature of the sentiment classification tag corresponding to the training sample; determine a first loss function of the entity recognition layer according to the entity attribute recognition result and the encoded feature of the entity attribute tag; determine a second loss function of the sentiment classification layer according to the sentiment classification result and the encoded feature of the sentiment classification tag; and determine a third loss function of the sentiment analysis model according to the first loss function and the second loss function, and update the model parameters of the sentiment analysis model based on the third loss function.

Embodiments of the disclosure provide a computer program product including a computer program or computer-executable instructions stored in a computer-readable storage medium. A processor of an electronic device reads the computer-executable instructions from the computer-readable storage medium, and executes the computer-executable instructions to enable the electronic device to perform the above method for sentiment analysis according to the embodiments of the disclosure.

Embodiments of the disclosure provide a computer-readable storage medium stored with computer-executable instructions. The computer-readable storage medium is stored with computer-executable instructions or computer programs that, when executed by a processor, enables the processor to perform the method for sentiment analysis according to the embodiments of the disclosure, for example the method for sentiment analysis illustrated in FIG. 3A.

In some embodiments, the computer-readable storage medium may be such as a Ferroelectric Random Access Memory (FRAM), a Read-Only Memory (ROM), a Programmable Read-Only Memory (PROM), an Electrically Programmable Read-Only Memory (EPROM), an Electrically Erasable Programmable Read-Only Memory (EEPROM), a flash memory, a magnetic surface memory, an optical disc, or a Compact Disk-Read Only Memory (CD-ROM), or may be a device containing one or a combination of those memories.

In some embodiments, the computer-executable instructions may be in form of a program, software, a software module, a script or codes, is coded in any form of programming language (including a compiled or interpreted language, or a declarative or procedural language), and may be deployed in any form, including being deployed as an independent program or being deployed as a module, component, a sub-routine or other units suitable for use in a computing environment.

As an example, the computer-executable instructions may but do not necessarily correspond to files in a file system. The computer-executable instructions may be stored in a part of a file for storing other programs or data, for example stored in one or more scripts in a hyper text markup language (HTML) document, or a single file dedicated to the discussed program, or stored in multiple collaborative files (for example, files storing one or more modules, sub-programs or code parts).

As an example, the computer-executable instructions may be deployed to be executed on one electronic device, or on multiple electronic devices at a same place, or multiple electronic devices distributed at multiple places and interconnected through a communication network.

Described above are merely embodiments of the disclosure, and are not used to limit the scope of protection of the disclosure. Any modification, equivalent replacement and improvement made within the spirit and scope of the disclosure shall fall within the scope of protection of the disclosure.

The invention claimed is:

1. A method for sentiment analysis, performed by a server comprising a processor and a memory, the method comprising:

obtaining, by the processor, a feature sequence corresponding to a text, wherein the feature sequence comprises encoded features;

processing, by the processor by using an attention mechanism, each of encoded features in the feature sequence, to obtain an attention feature of the text;

transferring, by the processor, the attention feature to a spatial transform feature of the text; and recognizing, by the processor, an entity attribute of the spatial transform feature, and performing sentiment mapping based on the spatial transform feature to obtain a sentiment polarity of the entity attribute;

wherein the method for sentiment analysis is implemented by calling a sentiment analysis model, the sentiment analysis model comprises: a feature extraction layer, an attention layer, at least one spatial transform layer, an entity recognition layer and a sentiment classification layer, each of the at least one spatial transform layer comprises a linear transform layer and a nonlinear transform layer, and the nonlinear transform layer is used for performing nonlinear mapping by using a nonlinear activation function which comprises a Rectified Linear Unit (ReLU) function, a sigmoid function or a tanh function;

wherein the method further comprises:

extracting, by the processor through the feature extraction layer, a feature sequence corresponding to a training sample, wherein the feature sequence comprises encoded features, and the training sample is labeled with an entity attribute tag and a sentiment classification tag;

processing, by the processor through the attention layer by using an attention mechanism, each of the encoded features in the feature sequence corresponding to the training sample, to obtain an attention feature corresponding to the training sample;

transferring, by the processor through the spatial transform layer, the attention feature corresponding to the training sample to a spatial transform feature of the training sample;

recognizing, by the processor through the entity recognition layer, entity attribute of the spatial transform feature of the training sample to obtain an entity attribute recognition result corresponding to the training sample, and performing, by the processor through the sentiment classification layer, sentiment mapping based on the spatial transform feature of the training sample to obtain a sentiment classification result corresponding to the training sample; and updating, by the processor, model parameters of the sentiment analysis model based on the entity attribute recognition result and the entity attribute tag which correspond to the training sample, and based on the sentiment classification result and the sentiment classification tag which correspond to the training sample.

2. The method of claim 1, wherein obtaining, by the processor, the feature sequence corresponding to the text comprises:

encoding, by the processor, each of tokens in the text, to obtain an encoded feature of the token;

encoding, by the processor, a sentiment classification identifier in the text, to obtain an encoded feature of the sentiment classification identifier; and generating, by the processor based on the encoded features of the tokens and the encoded feature of the sentiment classification identifier, the feature sequence of the text;

wherein the encoded feature of the sentiment classification identifier is at a start position in the feature sequence, and an order of the encoded features of the tokens in the feature sequence is same as an order of the tokens in the text.

3. The method of claim 2, wherein encoding, by the processor, each of the tokens in the text, to obtain the encoded feature of the token comprises:

performing, by the processor, following processing on each of the tokens:

vectorizing, by the processor, the token to obtain a word vector corresponding to the token;

performing, by the processor, position encoding on the token according to a position of the token in the text, to obtain a position vector of the token;

determining, by the processor, an attribution vector of the token according to a sentence to which the token belongs in the text; and obtaining, by the processor, the encoded feature of the token according to the word vector of the token, the position vector of the token and the attribution vector of the token.

4. The method of claim 1, wherein processing, by the processor by using the attention mechanism, the each of the encoded features in the feature sequence, to obtain the attention feature of the text comprises:

performing, by the processor, linear transform on the each of the encoded features in the feature sequence, to obtain a query feature, a key feature and a value feature that correspond to the each of the encoded features;

performing, by the processor, association processing based on the query feature and the key feature corresponding to the each of the encoded features, to obtain an attention weight of the each of the encoded features; and performing, by the processor, a weighted sum of the value features of the encoded features based on the attention weights of the encoded features, to obtain the attention feature of the text.

5. The method of claim 4, wherein performing, by the processor, association processing based on the query feature and the key feature corresponding to the each of the encoded features, to obtain the attention weight of the each of the encoded feature comprises:

performing, by the processor, following processing on the each of the encoded features:

performing, by the processor, association processing based on the query feature and the key feature corresponding to the each of the encoded features to obtain a first influence factor of the encoded feature, wherein the first influence factor is positively correlated to the query feature and a transposition of the key feature, respectively, and the first influence factor is negatively correlated to a length of the encoded feature;

obtaining, by the processor, a maximum prediction length of the feature sequence and a scaling coefficient for controlling a scaling degree of the maximum prediction length, and determining, by the processor, a second influence factor of the encoded feature based on the scaling coefficient, the maximum prediction length and the first influence factor; and performing, by the processor, maximum likelihood processing based on the first influence factor and the second influence factor, to obtain the attention weight of the encoded feature.

6. The method of claim 1, wherein transferring, by the processor, the attention feature to the spatial transform feature of the text comprises:

obtaining, by the processor, the at least one spatial transform layer; and transferring, by the processor through the at least one spatial transform layer, the attention feature to the spatial transform feature of the text.

7. The method of claim 6, wherein transferring, by the processor through the at least one spatial transform layer, the attention feature to the spatial transform feature of the text comprises:

in a case that a number of the at least one spatial transform layer is N, performing, by the processor, linear transform on the attention feature through a linear transform layer in a first spatial transform layer to obtain a first intermediate transform feature, and performing, by the processor, nonlinear mapping on the first intermediate transform feature through a nonlinear transform layer in the first spatial transform layer to obtain a first spatial transform feature;

performing, by the processor, through a linear transform layer in an i-th spatial transform layer, linear transform on an (i−1)-th spatial transform feature output by an (i−1)-th spatial transform layer to obtain an i-th intermediate transform feature, and performing, by the processor through a nonlinear transform layer in the i-th spatial transform layer, nonlinear mapping on the i-th intermediate transform feature to obtain an i-th spatial transform feature; and determining, by the processor, an N-th spatial transform feature output by an N-th spatial transform layer as the spatial transform feature of the text;

wherein N is a positive integer greater than 3, and i is a positive integer greater than 1 and smaller than N−1.

8. The method of claim 1, wherein recognizing, by the processor, an entity attribute of the spatial transform feature comprises:

performing, by the processor, entity attribute mapping on the spatial transform feature to obtain a corresponding first mapping feature; and offsetting, by the processor, the corresponding first mapping feature to obtain the entity attribute corresponding to the text.

9. The method of claim 8, wherein performing, by the processor, sentiment mapping based on the spatial transform feature to obtain the sentiment polarity of the entity attribute comprises:

performing, by the processor, sentiment polarity mapping on the spatial transform feature to obtain a corresponding second mapping feature;

offsetting, by the processor, the corresponding second mapping feature to obtain a sentiment classification corresponding to the text; and performing, by the processor, sentiment mapping on the entity attribute based on the sentiment classification, to obtain the sentiment polarity of the entity attribute.

10. The method of claim 1, wherein updating, by the processor, the model parameters of the sentiment analysis model based on the entity attribute recognition result and the entity attribute tag which correspond to the training sample, and based on the sentiment classification result and the sentiment classification tag which correspond to the training sample comprises:

performing, by the processor, one-hot encoding on the entity attribute tag and the sentiment classification tag corresponding to the training sample, respectively, to obtain an encoded feature of the entity attribute tag and an encoded feature of the sentiment classification tag that correspond to the training sample;

determining, by the processor, a first loss function of the entity recognition layer according to the entity attribute recognition result and the encoded feature of the entity attribute tag;

determining, by the processor, a second loss function of the sentiment classification layer according to the sentiment classification result and the encoded feature of the sentiment classification tag; and determining, by the processor, a third loss function of the sentiment analysis model according to the first loss function and the second loss function, and updating the model parameters of the sentiment analysis model based on the third loss function.

11. An apparatus for sentiment analysis, comprising:

a processor and a memory configured to store a computer program runnable on the processor, wherein the processor is configured to:

obtain a feature sequence corresponding to a text, wherein the feature sequence comprises encoded features;

process, by using an attention mechanism, each of the encoded features in the feature sequence, to obtain an attention feature corresponding to the text;

transfer the attention feature to a spatial transform feature of the text; and recognize an entity attribute of the spatial transform feature, and perform sentiment mapping based on the spatial transform feature to obtain a sentiment polarity of the entity attribute;

wherein the method for sentiment analysis is implemented by calling a sentiment analysis model, the sentiment analysis model comprises: a feature extraction layer, an attention layer, at least one spatial transform layer, an entity recognition layer and a sentiment classification layer, each of the at least one spatial transform layer comprises a linear transform layer and a nonlinear transform layer, and the nonlinear transform layer is used for performing nonlinear mapping by using a nonlinear activation function which comprises a Rectified Linear Unit (ReLU) function, a sigmoid function or a tanh function;

wherein the processor is further configured to:

extract, through the feature extraction layer, a feature sequence corresponding to a training sample, wherein the feature sequence comprises encoded features, and the training sample is labeled with an entity attribute tag and a sentiment classification tag;

process, through the attention layer by using an attention mechanism, each of the encoded features in the feature sequence corresponding to the training sample, to obtain an attention feature corresponding to the training sample;

transfer, through the spatial transform layer, the attention feature corresponding to the training sample to a spatial transform feature of the training sample;

recognize, through the entity recognition layer, entity attribute of the spatial transform feature of the training sample to obtain an entity attribute recognition result corresponding to the training sample, and perform, through the sentiment classification layer, sentiment mapping based on the spatial transform feature of the training sample to obtain a sentiment classification result corresponding to the training sample; and update model parameters of the sentiment analysis model based on the entity attribute recognition result and the entity attribute tag which correspond to the training sample, and based on the sentiment classification result and the sentiment classification tag which correspond to the training sample.

12. The apparatus of claim 11, wherein the processor is further configured to:

encode each of tokens in the text, to obtain an encoded feature of the token;

encode a sentiment classification identifier in the text, to obtain an encoded feature of the sentiment classification identifier; and generate, based on the encoded features of the tokens and the encoded feature of the sentiment classification identifier, the feature sequence of the text;

wherein the encoded feature of the sentiment classification identifier is at a start position in the feature sequence, and an order of the encoded features of the tokens in the feature sequence is same as an order of the tokens in the text.

13. The apparatus of claim 12, wherein the processor is further configured to:

perform following processing on each of the tokens:

vectorize the token to obtain a word vector corresponding to the token;

perform position encoding on the token according to a position of the token in the text, to obtain a position vector of the token;

determine an attribution vector of the token according to a sentence to which the token belongs in the text; and obtain the encoded feature of the token according to the word vector of the token, the position vector of the token and the attribution vector of the token.

14. The apparatus of claim 11, wherein the processor is further configured to:

perform linear transform on the each of the encoded features in the feature sequence, to obtain a query feature, a key feature and a value feature that correspond to the each of the encoded features;

perform association processing based on the query feature and the key feature corresponding to the each of the encoded features, to obtain an attention weight of the each of the encoded features; and perform a weighted sum of the value features of the encoded features based on the attention weights of the encoded features, to obtain the attention feature of the text.

15. The apparatus of claim 14, wherein the processor is further configured to:

perform following processing on the each of the encoded features:

perform association processing based on the query feature and the key feature corresponding to the each of the encoded features to obtain a first influence factor of the encoded feature, wherein the first influence factor is positively correlated to the query feature and a transposition of the key feature, respectively, and the first influence factor is negatively correlated to a length of the encoded feature;

obtain a maximum prediction length of the feature sequence and a scaling coefficient for controlling a scaling degree of the maximum prediction length, and determine a second influence factor of the encoded feature based on the scaling coefficient, the maximum prediction length and the first influence factor; and perform maximum likelihood processing based on the first influence factor and the second influence factor, to obtain the attention weight of the encoded feature.

16. The apparatus of claim 11, wherein the processor is further configured to:

obtain the at least one spatial transform layer; and transfer, through the at least one spatial transform layer, the attention feature to the spatial transform feature of the text.

17. The apparatus of claim 16, wherein the processor is further configured to:

in a case that a number of the at least one spatial transform layer is N, perform linear transform on the attention feature through a linear transform layer in a first spatial transform layer to obtain a first intermediate transform feature, and perform nonlinear mapping on the first intermediate transform feature through a nonlinear transform layer in the first spatial transform layer to obtain a first spatial transform feature;

perform, through a linear transform layer in an i-th spatial transform layer, linear transform on an (i−1)-th spatial transform feature output by an (i−1)-th spatial transform layer to obtain an i-th intermediate transform feature, and perform, through a nonlinear transform layer in the i-th spatial transform layer, nonlinear mapping on the i-th intermediate transform feature to obtain an i-th spatial transform feature; and determine an N-th spatial transform feature output by an N-th spatial transform layer as the spatial transform feature of the text;

wherein N is a positive integer greater than 3, and i is a positive integer greater than 1 and smaller than N−1.

18. The apparatus of claim 11, wherein the processor is further configured to:

perform entity attribute mapping on the spatial transform feature to obtain a corresponding first mapping feature; and offset the corresponding first mapping feature to obtain the entity attribute corresponding to the text.

19. A non-transitory computer-readable storage medium having stored thereon computer-executable instructions or computer programs that, when executed by a processor, implement a method for sentiment analysis, wherein the method comprises:

obtaining a feature sequence corresponding to a text, wherein the feature sequence comprises encoded features;

processing, by using an attention mechanism, each of encoded features in the feature sequence, to obtain an attention feature of the text;

transferring the attention feature to a spatial transform feature of the text; and recognizing an entity attribute of the spatial transform feature, and performing sentiment mapping based on the spatial transform feature to obtain a sentiment polarity of the entity attribute;

wherein the method for sentiment analysis is implemented by calling a sentiment analysis model, the sentiment analysis model comprises: a feature extraction layer, an attention layer, at least one spatial transform layer, an entity recognition layer and a sentiment classification layer, each of the at least one spatial transform layer comprises a linear transform layer and a nonlinear transform layer, and the nonlinear transform layer is used for performing nonlinear mapping by using a nonlinear activation function which comprises a Rectified Linear Unit (ReLU) function, a sigmoid function or a tanh function;

wherein the method further comprises:

extracting, through the feature extraction layer, a feature sequence corresponding to a training sample, wherein the feature sequence comprises encoded features, and the training sample is labeled with an entity attribute tag and a sentiment classification tag;

processing, through the attention layer by using an attention mechanism, each of the encoded features in the feature sequence corresponding to the training sample, to obtain an attention feature corresponding to the training sample;

transferring, through the spatial transform layer, the attention feature corresponding to the training sample to a spatial transform feature of the training sample;

recognizing, through the entity recognition layer, entity attribute of the spatial transform feature of the training sample to obtain an entity attribute recognition result corresponding to the training sample, and performing, through the sentiment classification layer, sentiment mapping based on the spatial transform feature of the training sample to obtain a sentiment classification result corresponding to the training sample; and updating model parameters of the sentiment analysis model based on the entity attribute recognition result and the entity attribute tag which correspond to the training sample, and based on the sentiment classification result and the sentiment classification tag which correspond to the training sample, wherein the updated model parameters are stored in a memory.

* * * * *